(12) United States Patent
Embler et al.

(10) Patent No.: US 12,343,798 B2
(45) Date of Patent: Jul. 1, 2025

(54) MULTI-MATERIAL STRUCTURES AND METHODS

(71) Applicant: The Boeing Company, Arlington, VA (US)

(72) Inventors: Jonathan D. Embler, Santa Ana, CA (US); William E. O'Connor, Santa Monica, CA (US); Tobias Schaedler, Oak Park, CA (US); Eric C. Clough, Santa Monica, CA (US); Raymond Nguyen, Anaheim, CA (US); Sonia Zacher, Santa Monica, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/178,771

(22) Filed: Mar. 6, 2023

(65) Prior Publication Data

US 2023/0415236 A1 Dec. 28, 2023

Related U.S. Application Data

(60) Provisional application No. 63/367,062, filed on Jun. 27, 2022.

(51) Int. Cl.
| | |
|---|---|
| *B22F 7/08* | (2006.01) |
| *B22F 10/38* | (2021.01) |
| *B22F 10/43* | (2021.01) |
| *B22F 10/60* | (2021.01) |
| *B33Y 80/00* | (2015.01) |
| *B33Y 10/00* | (2015.01) |

(52) U.S. Cl.
CPC .............. *B22F 10/43* (2021.01); *B22F 10/38* (2021.01); *B22F 10/60* (2021.01); *B22F 2301/205* (2013.01); *B22F 2303/05* (2013.01); *B22F 2303/40* (2013.01)

(58) Field of Classification Search
CPC ................................ B33Y 10/00; B33Y 80/00
See application file for complete search history.

(56) References Cited

U.S. PATENT DOCUMENTS

| | | | |
|---|---|---|---|
| 10,857,628 B2 | 12/2020 | Mann | |
| 10,926,480 B2 | 2/2021 | Yousefiani et al. | |
| 11,255,641 B2 | 2/2022 | Zamorano Senderos et al. | |
| 2008/0078482 A1* | 4/2008 | Cotton | C22F 1/183 148/669 |
| 2019/0233924 A1 | 8/2019 | Parrish et al. | |
| 2020/0248285 A1 | 8/2020 | Rajan et al. | |
| 2022/0023942 A1 | 1/2022 | Sungail et al. | |

FOREIGN PATENT DOCUMENTS

| | | |
|---|---|---|
| EP | 3 216 547 | 9/2017 |
| WO | WO 2013/112217 | 8/2013 |

OTHER PUBLICATIONS

European Patent Office, International Search Report and Written Opinion, Intl. App. No. PCT/US2023/068759 (Oct. 9, 2023).

* cited by examiner

*Primary Examiner* — Adam Krupicka
(74) *Attorney, Agent, or Firm* — Walters & Wasylyna LLC

(57) ABSTRACT

A multi-material structure includes a refractory portion with a metal or metal alloy of at least one of niobium (Nb), molybdenum (Mo), tantalum (Ta), tungsten (W), rhenium (Re), iridium (Ir), vanadium (V), and ruthenium (Ru). A structural portion is metallurgically joined with the refractory portion. The structural portion includes a titanium (Ti) alloy. At least one of the refractory and structural portions is additively manufactured.

20 Claims, 11 Drawing Sheets

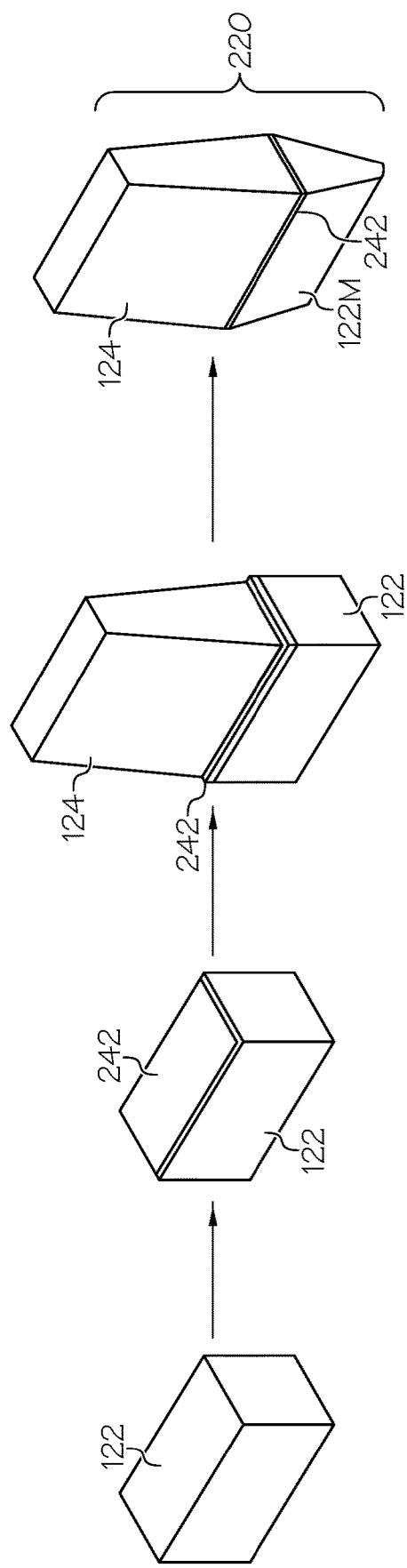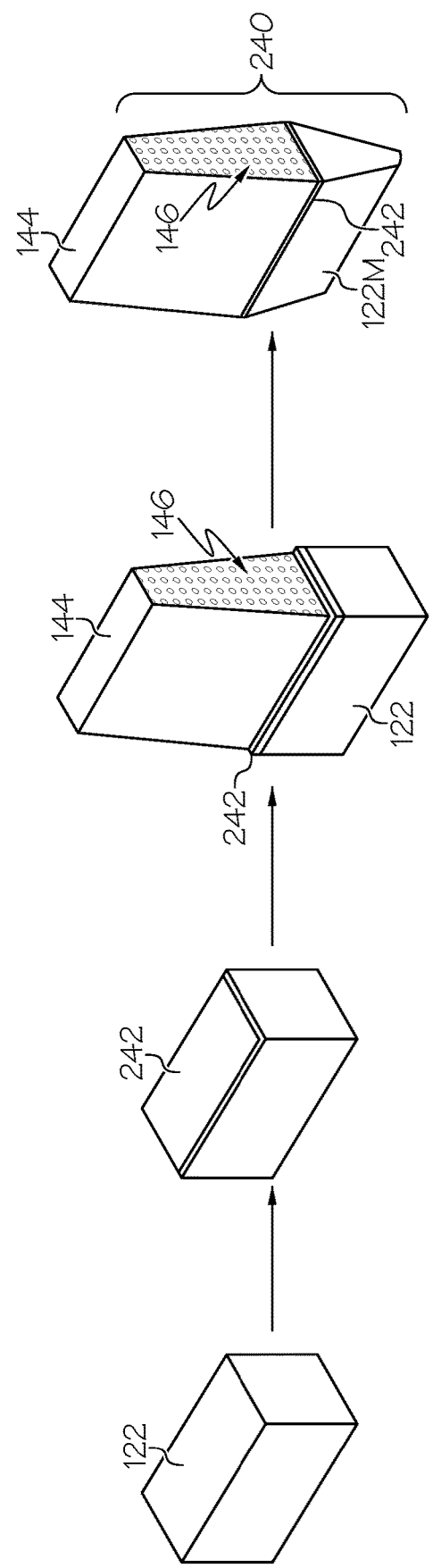
FIG. 6
FIG. 7

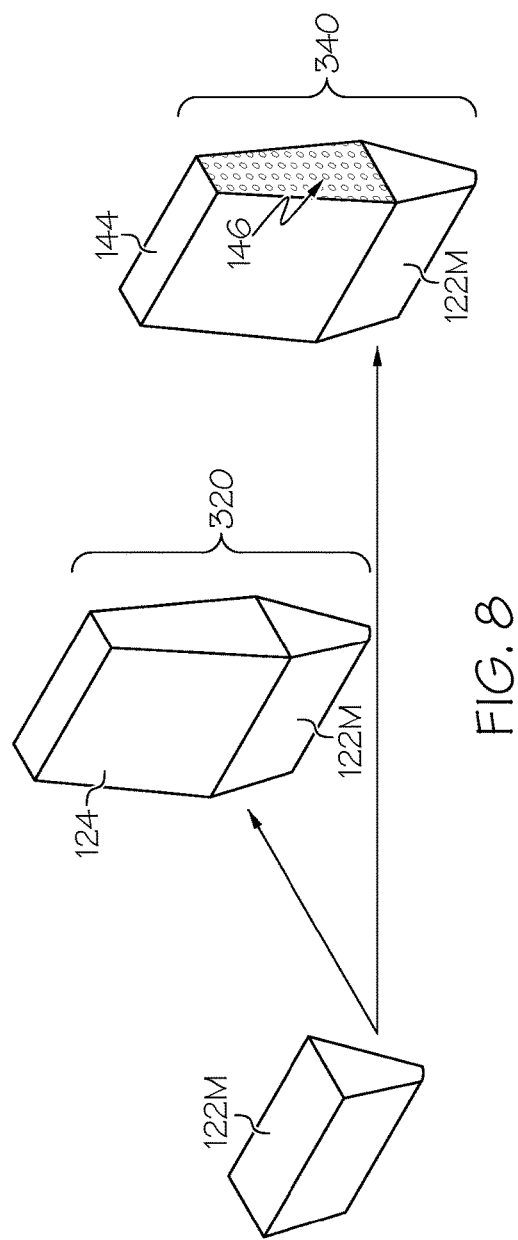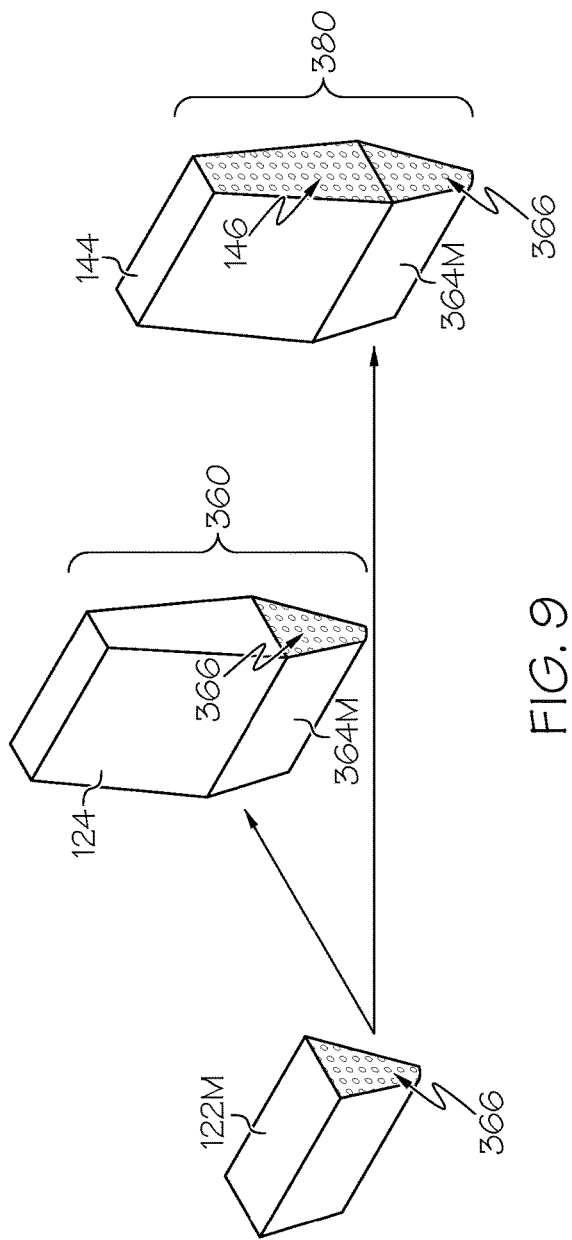

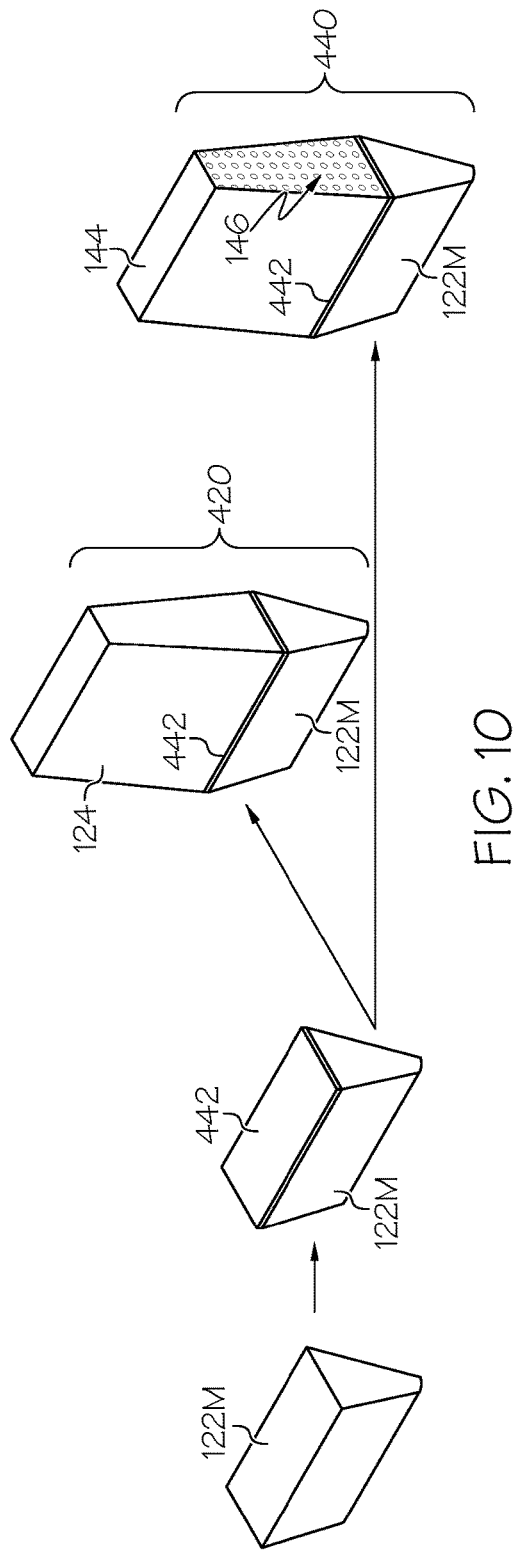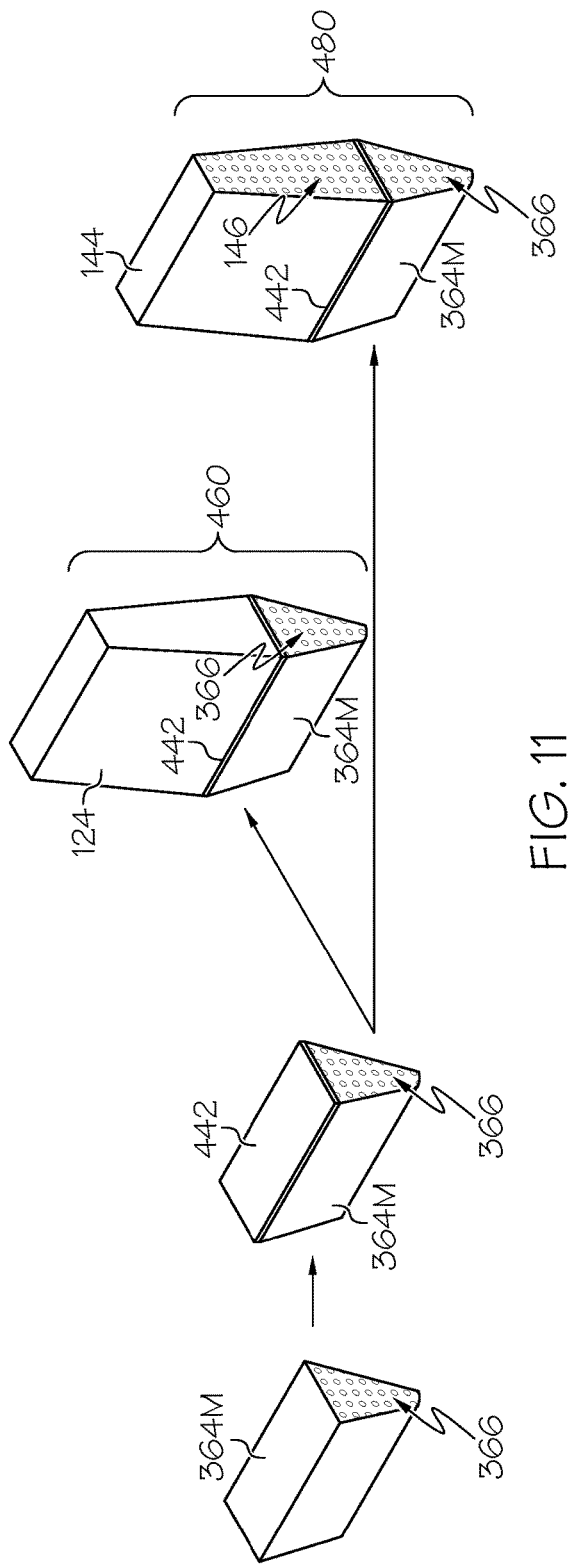

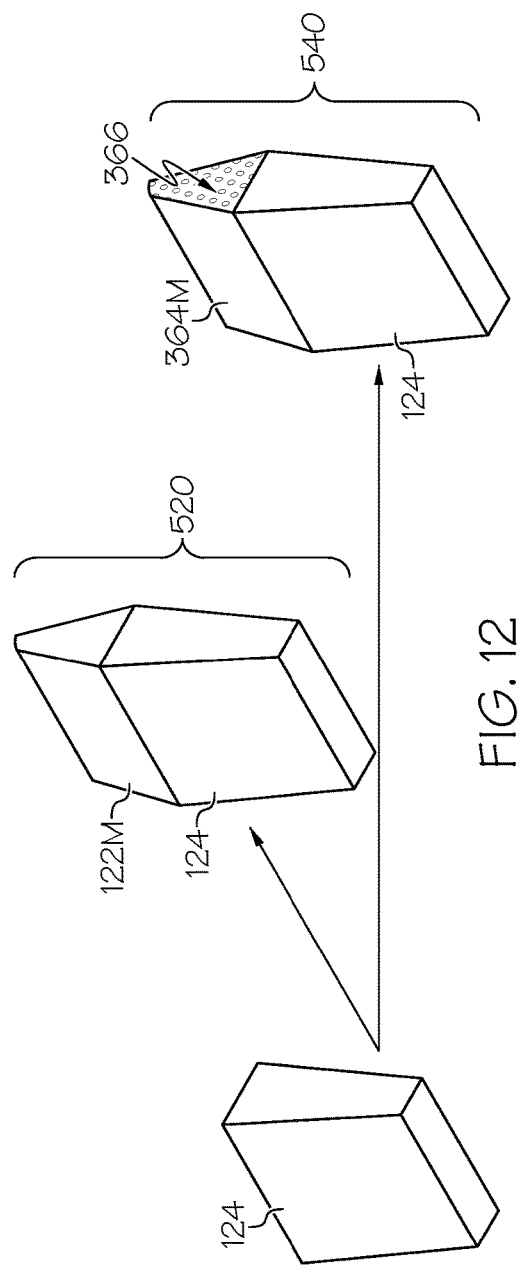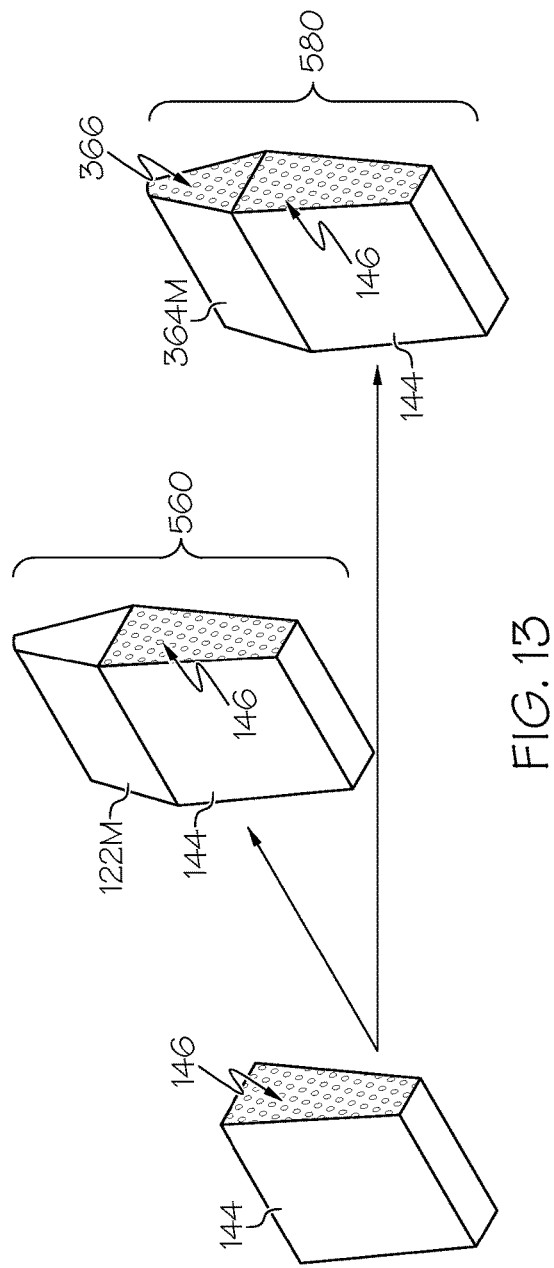

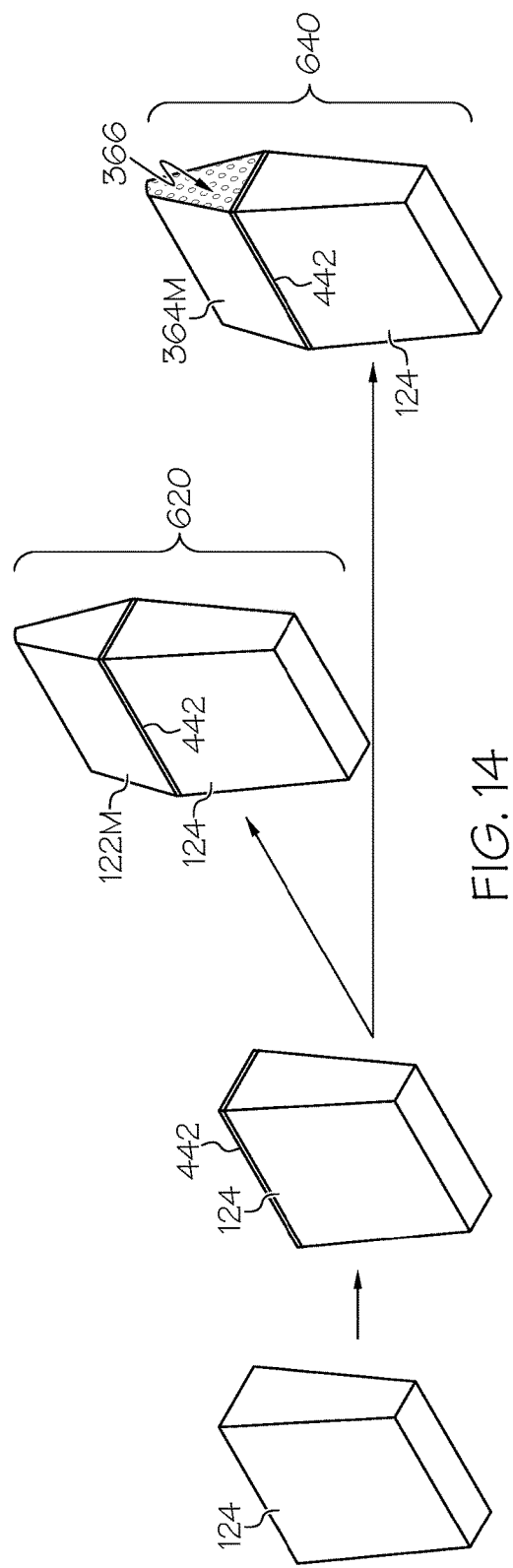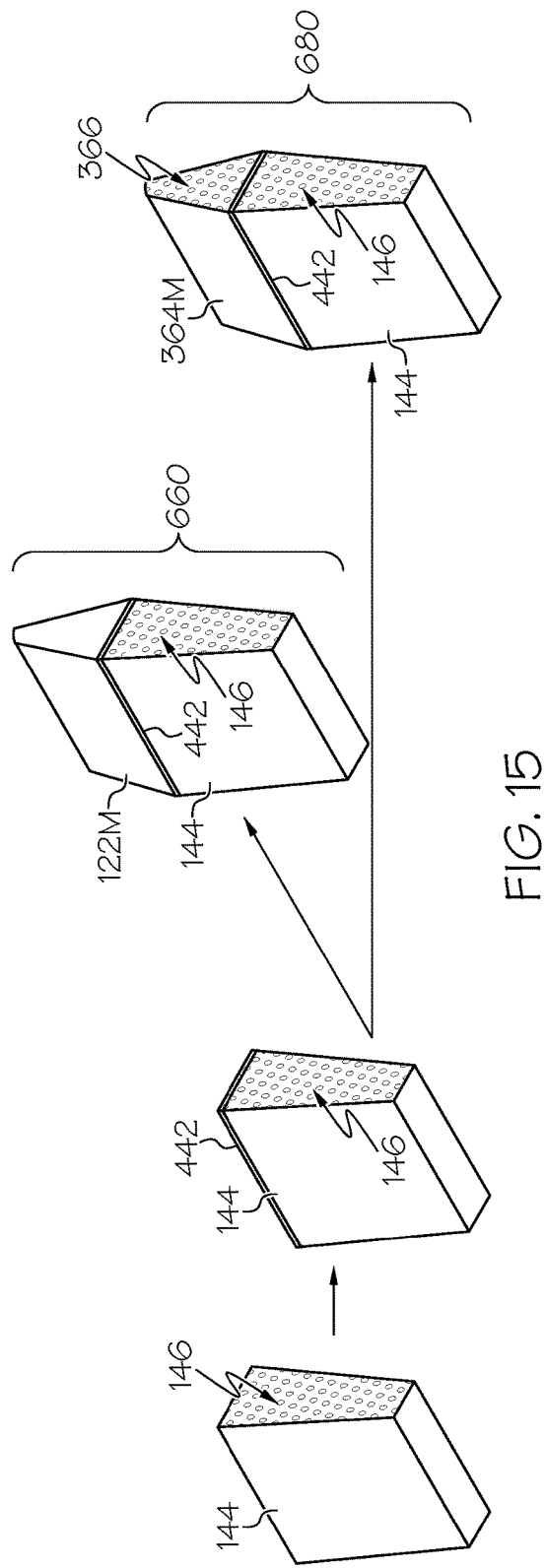
FIG. 14
FIG. 15

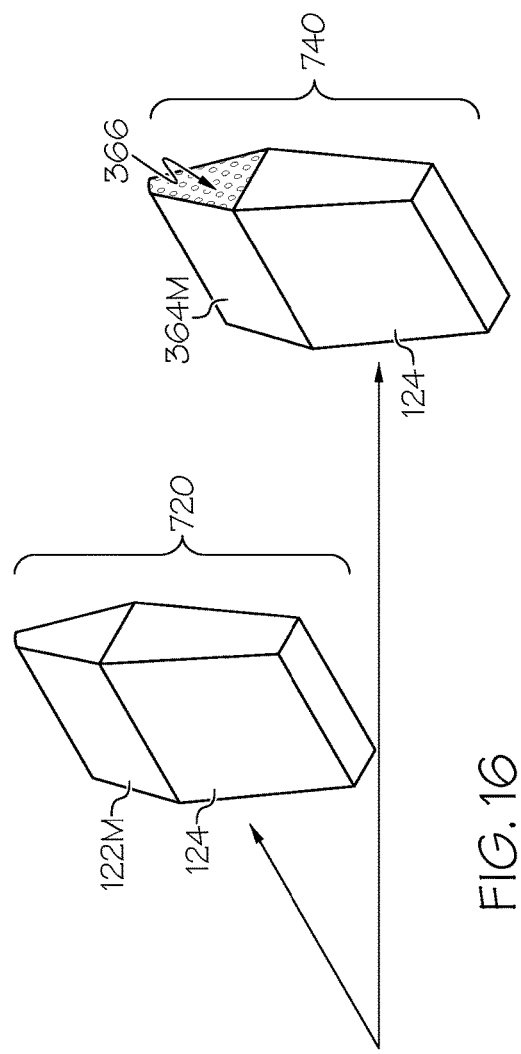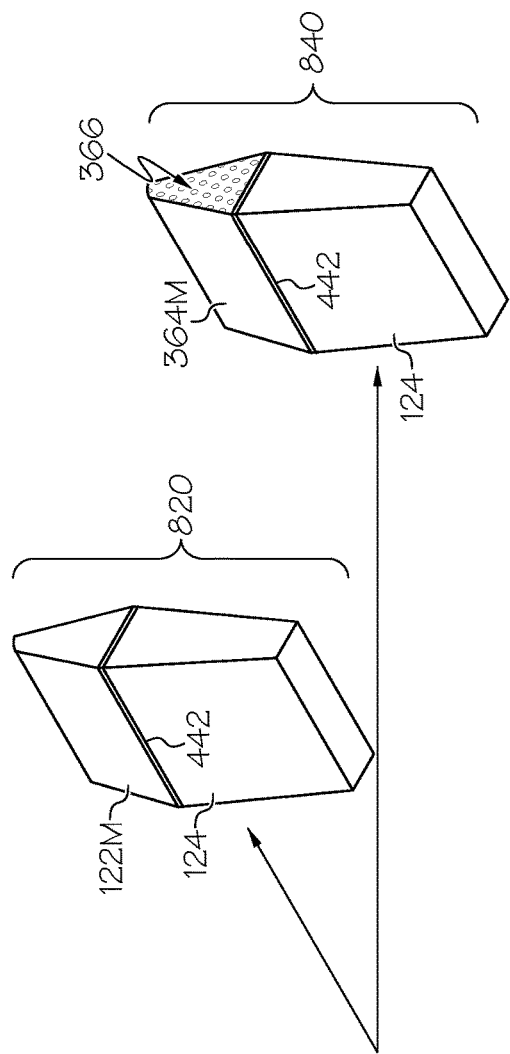
FIG. 16
FIG. 17

MULTI-MATERIAL STRUCTURES AND METHODS

PRIORITY

This application claims priority from U.S. Ser. No. 63/367,062 filed on Jun. 27, 2022.

FIELD

The subject disclosure generally relates to strong high temperature alloy materials and, more particularly, to alloy materials formed into multi-material structures, as well as methods for manufacturing multi-material structures.

BACKGROUND

Some aerospace applications require the use of certain alloys having relatively high mechanical strength. For example, these applications may include structural components that are exposed to relatively elevated temperatures. Presently known and available metals and alloys thereof have disadvantages in that they typically are relatively heavy, costly and lose at least a portion of their mechanical strength at elevated temperatures.

SUMMARY

The disclosed multi-material structures overcome many of the disadvantages associated with presently known and available metals and alloys.

One aspect of the disclosed multi-material structure includes a refractory portion. The refractory portion includes at least one of niobium (Nb), molybdenum (Mo), tantalum (Ta), tungsten (W), rhenium (Re), iridium (Ir), vanadium (V), and ruthenium (Ru). A structural portion is metallurgically joined with the refractory portion. The structural portion includes a titanium (Ti) alloy. At least one of the refractory and structural portions is additively manufactured.

The refractory portion may be a body centered cubic metal alloy. The structural portion may be a titanium alloy in a phase of at least one of a near-alpha, alpha-beta, near-beta, beta, and gamma. The structural portion may include, for example, at least one of Ti-6Al-4V, Ti-6Al-2Sn-4Zr-2Mo, and TiAl. At least one of the refractory and structural portions may include a core having an open cell structure, such as an additive core.

At least one of the refractory and structural portions may be machined. At least one of the refractory and structural portions may be additively manufactured to a desired shape.

The disclosed multi-material structure further may include an interface portion between and metallurgically joined with the refractory and structural portions. The interface portion may be formed by additive manufacturing directly onto the refractory portion. At least one of the refractory and structural portions is applied directly to the interface portion by additive manufacturing. The interface portion may be formed from a mixed composition joining the refractory and structural portions. The interface portion may be formed from a mixed composition powder deposited onto at least one of the refractory and structural portions by additive manufacturing. The interface portion may be formed by additive manufacturing. The interface portion may be formed by functional grading additive manufacturing directly onto the refractory portion. The structural portion may be metallurgically joined directly to the interface portion.

In another aspect, a multi-material structure includes a refractory portion. A structural portion may be deposited directly onto the refractory portion. The structural portion has a physical characteristic different from a physical characteristic of the refractory portion. The structural portion may be deposited onto the refractory portion by additive manufacturing. The interface portion may be formed by functional grading additive manufacturing directly onto the refractory portion. The refractory portion includes at least one of niobium (Nb), molybdenum (Mo), tantalum (Ta), tungsten (W), rhenium (Re), iridium (Ir), vanadium (V), and ruthenium (Ru), and alloys thereof. The structural portion may include, for example, at least one of Ti-6Al-4V, Ti-6Al-2Sn-4Zr-2Mo, and TiAl. The structural portion may include a titanium alloy in a phase of at least one of a near-alpha, alpha-beta, near-beta, beta, and gamma. At least one of the refractory and structural portions may include a core having an open cell structure, such as an additive core.

At least one of the refractory and structural portions may be machined. At least one of the refractory and structural portions may be additively manufactured to a desired shape.

The multi-material structure may further include an interface portion between the refractory portion and the structural portion. The interface portion may be deposited by additive manufacturing. The interface portion may be formed from a mixed composition joining the refractory and structural portions. The interface portion may be formed from a mixed composition powder deposited onto at least one of the refractory and structural portions by additive manufacturing.

It should be apparent that the order and construction among the refractory portion, structural portion, and interface portion may be varied. For example, the refractory portion could be applied to the structural portion. In another example, the interface portion could be first applied to the refractory portion and the structural portion be applied to the interface portion.

Also disclosed are methods for manufacturing a multi-material structure. The multi-material structure includes a refractory portion and a structural portion metallurgically joined with the refractory portion. The refractory portion has a metal alloy of at least one of niobium (Nb), molybdenum (Mo), tantalum (Ta), tungsten (W), rhenium (Re), iridium (Ir), vanadium (V), and ruthenium (Ru). The method includes a step of depositing by additive manufacturing a titanium alloy onto the refractory portion to form the structural portion. Optionally forming at least one of the refractory and structural portions with a core having an open cell structure, such as an additive core having an open cell structure.

The titanium alloy may be in a phase of at least one of a near-alpha, alpha-beta, near-beta, beta, and gamma. The titanium alloy may include, for example, at least one of Ti-6Al-4V, Ti-6Al-2Sn-4Zr-2Mo, and TiAl. Depositing the titanium alloy onto the metal alloy may include constructing a core having an open cell structure, such as an additive core having an open cell structure. The refractory potion is formed by additive manufacturing.

The method may further include machining at least one of the refractory and structural portions. The method may further include forming at least one of the refractory and structural portions to a desired shape by additive manufacturing.

The method may further include forming by additive manufacture an interface portion on the refractory portion prior to depositing the titanium alloy onto the refractory portion. The interface portion may be formed from a mixed composition joining the refractory and structural portions. The interface portion may be formed by depositing a mixed composition powder deposited onto at least one of the refractory and structural portions by additive manufacturing. The interface portion may be formed by functional grading additive manufacture.

In yet another aspect a method for manufacturing a multi-material structure includes a refractory portion. A structural portion is metallurgically joined with the refractory portion. The structural portion is a titanium alloy. The method includes a step of depositing by additive manufacturing a metal or metal alloy onto the titanium alloy of the structural portion to yield the refractory portion. The metal alloy of the refractory portion includes at least one of niobium (Nb), molybdenum (Mo), tantalum (Ta), tungsten (W), rhenium (Re), iridium (Ir), vanadium (V), and ruthenium (Ru). As one general non-limiting example, the metal or metal alloy of the refractory portion comprises niobium (Nb). As one specific non-limiting example, the metal or metal alloy of the refractory portion comprises a niobium-hafnium-titanium alloy.

An optional method step is depositing by additive manufacture the metal or metal alloy onto the titanium alloy by additive manufacturing the metal or metal alloy to yield the refractory portion of a core having an open cell structure, such as an additive core having an open cell structure. The titanium alloy is in a phase of at least one of a near-alpha, alpha-beta, near-beta, beta, and gamma. The titanium alloy may include, for example, at least one of Ti-6Al-4V, Ti-6Al-2Sn-4Zr-2Mo, and TiAl. The structural potion is formed by additive manufacturing.

The method may further include forming an interface portion between the refractory and structural portions. The interface portion is formed by additive manufacturing. The interface portion is formed from a mixed composition joining the refractory portion and the structural portion. The interface portion is formed by depositing a mixed composition powder onto at least one of the refractory and structural portions by additive manufacturing.

It should be apparent that the order and structure among the refractory portion, structural portion, and interface portion may be varied. For example, the refractory portion could be applied to the structural portion. In another example, the interface portion could be first applied to the refractory portion and the structural portion be applied to the interface portion. The interface portion may be formed by functional grading additive manufacture.

Other aspects of the disclosed multi-material structure will become apparent from the following detailed description, the accompanying drawings and the appended claims.

BRIEF DESCRIPTION OF THE DRAWINGS

FIGS. 4-17 are perspective illustrations of specific stages of multi-material structures according to alternative aspects and outlining various methods for manufacturing the disclosed multi-material structure.

DETAILED DESCRIPTION

Figure 1:
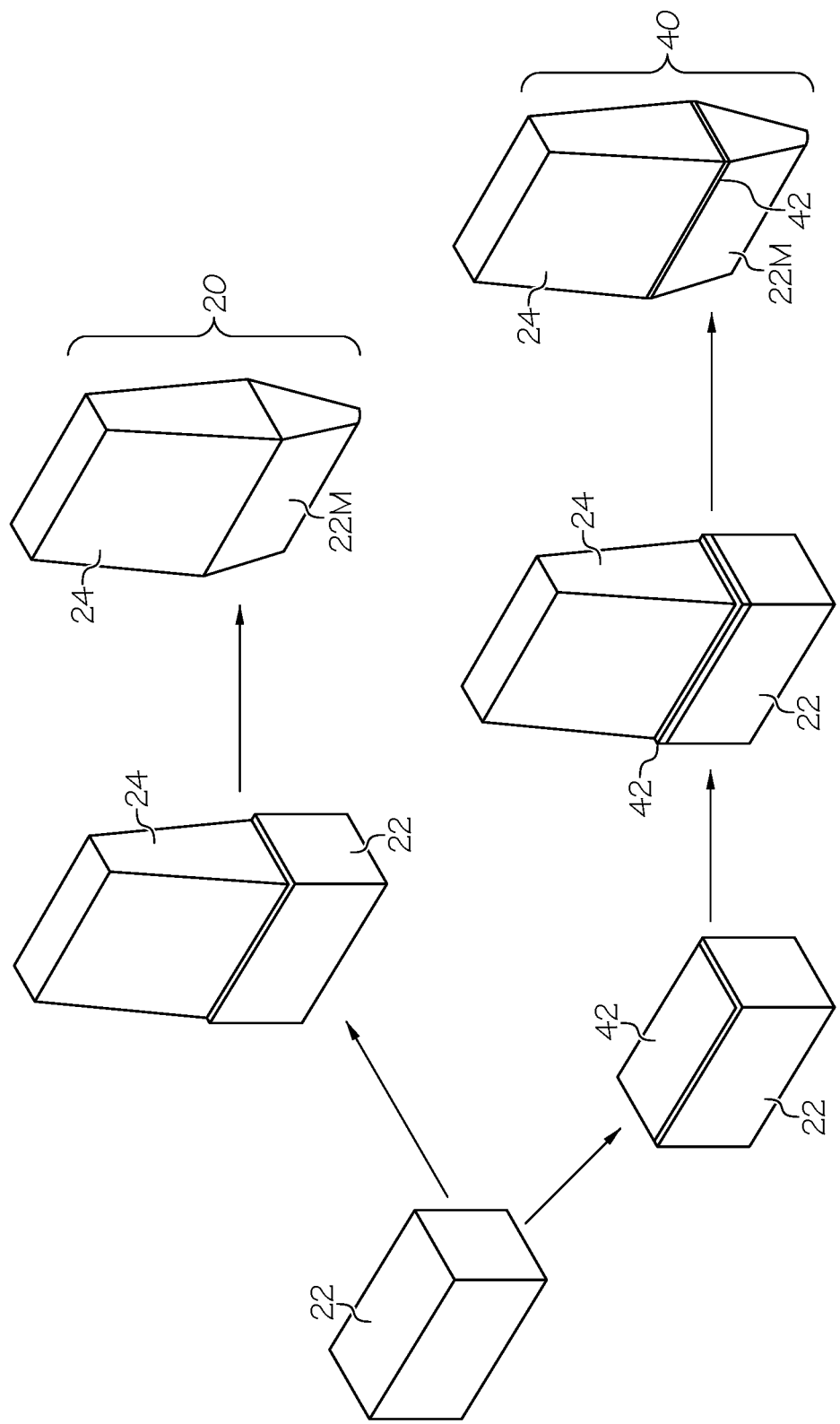
FIG. 1 is an illustration of general representative stages of the disclosed multi-material structure and steps to manufacture the disclosed multi-material structure.

FIG. 1 depicts a multi-material structure 20, 40 constructed according to an aspect of the present disclosure. Such a multi-material structure 20, 40 is intended for and suited for use in applications where relatively high strength and resistance to relatively elevated temperatures is desired or required. Thus, the multi-material structure 20, 40 may overcome disadvantages associated with previously known and available metals and alloys. Like reference numerals will be used throughout to refer to identical or similar components in the various aspects.

An overview of a multi-material structure 20, 40, according to the subject disclosure, is illustrated in FIG. 1 showing different exemplary structures and methods for producing the multi-material structure. A refractory portion 22 is supplied as a starting point for constructing the multi-material structure 20, 40. In the upper illustration of FIG. 1, a structural portion 24 is metallurgically joined with the refractory portion 22 by additive manufacturing. The refractory portion 22 may then be machined to a finished desired configuration 22M, such as that illustrated. It should be noted that the finished refractory portion 22M could be formed to a desired finished configuration in alternate aspects as will be described below. Either or both of the refractory 22 and structural 24 portions may be constructed by additive manufacturing. The refractory portion 22 and the structural portion 24 may be formed and provided in any suitable configuration depending on the application in which they are to be used.

In the lower portion of FIG. 1, the same refractory portion 22 is supplied as a starting point. An interface portion 42 is metallurgically joined with the refractory portion 22. The structural portion 24 is metallurgically joined with the interface portion 42. The refractory portion 22 may be machined to a finished desired configuration 22M, such as that illustrated in FIG. 1. It should be noted again that the finished refractory portion 22M could be formed to a desired finished configuration in alternate aspects as will be described below. Any or all of the refractory 22, structural 24, and the interface 42 portions may be constructed by additive manufacturing. The suffix "M" is used throughout to designate a component to be in a finished desired configuration, such as 22M.

Figure 2:
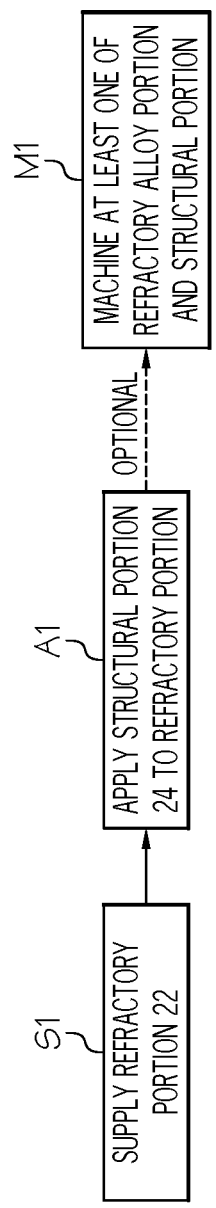
FIG. 2 is a flow diagram illustrating exemplary steps for manufacturing the disclosed multi-material structure according to one aspect.

FIG. 2 illustrates the general method steps of manufacturing the multi-material structure 20 according to one aspect. A refractory portion 22 is formed or supplied in step S1. A structural portion 24 is metallurgically joined with the refractory portion 22 in step A1 by additive manufacturing. The refractory portion 22 may then be machined to a finished desired configuration 22M, such as that illustrated in optional step M1. The refractory portion 22 could be formed and supplied in the finished desired configuration 22M. Any or all of the refractory 22 and structural 24 portions may be constructed by additive manufacturing. It should be apparent that the order of manufacture and construction between the refractory portion 22 and the structural 24 portion may be varied.

Figure 3:
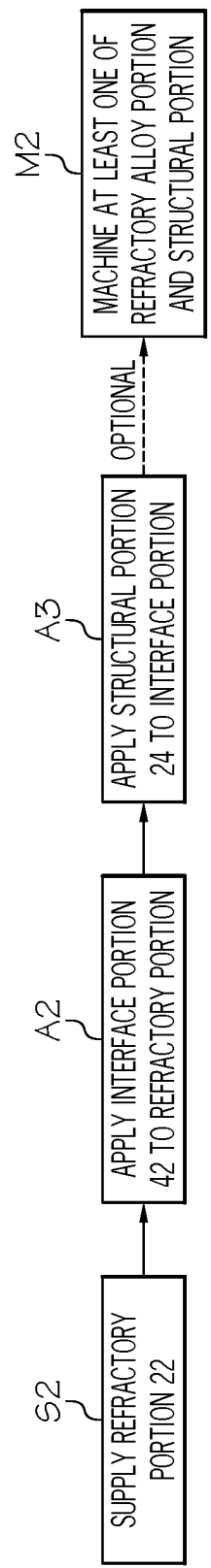
FIG. 3 is a flow diagram illustrating exemplary steps needed to manufacture of the disclosed multi-material structure according to another aspect.

FIG. 3 illustrates the general method steps of manufacturing the multi-material structure 40. A refractory portion 22 is formed or supplied in step S2. An interface portion 42 is metallurgically joined with the refractory portion 22 in step A2 by additive manufacturing. A structural portion 24 is then metallurgically joined with the interface portion 42 in step A3 by additive manufacturing. The refractory portion 22 may then be machined to a finished desired configuration 22M, such as that illustrated, in optional step M2. The refractory portion 22 could be formed and supplied in a desired finished configuration 22M. Any or all of the refractory 22, structural 24, and the interface portions 42 may be constructed by additive manufacturing.

It should be apparent that the order of manufacture and construction among the refractory portion 22, the structural portion 24 and interface portion 42 may be varied.

Figure 4:
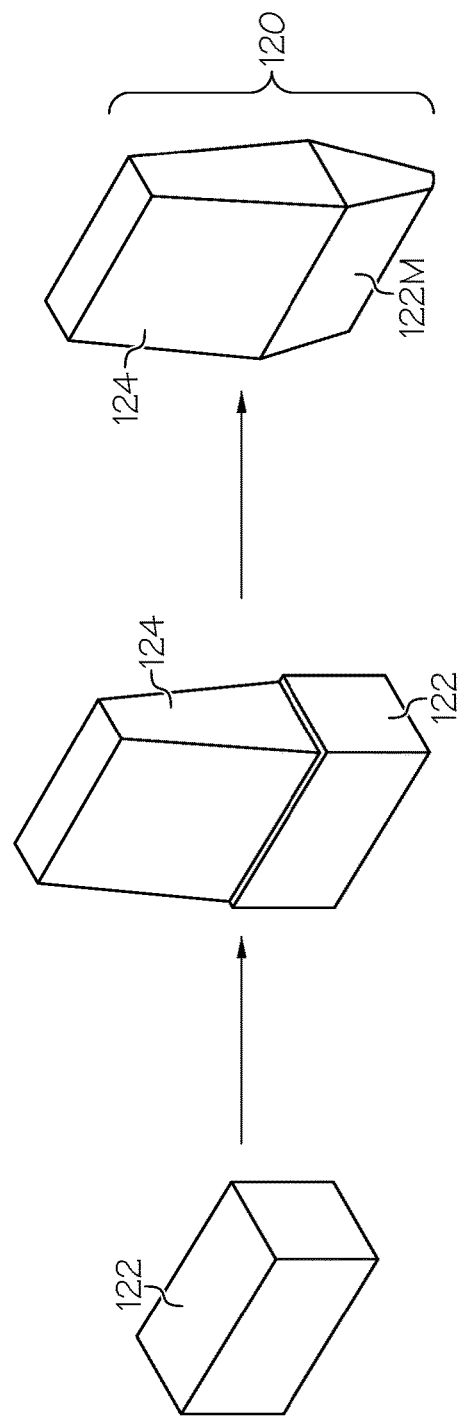

More specifically, a multi-material structure 120 constructed according to one aspect is illustrated in FIG. 4. Such a multi-material structure 120 is intended for and suited for use in applications where relatively high strength and resistance to relatively elevated temperatures is desired or required. Thus, the multi-material structure 120 overcomes the disadvantages associated with previously known and available metals and alloys by being relatively light in weight, relatively inexpensive and retains much of its mechanical strength at elevated temperatures.

To construct the multi-material structure 120 (FIG. 4) a refractory portion 122 is formed or supplied. The refractory portion 122 has a first physical characteristic that may include excellent resistance to relatively high temperatures. The refractory portion 122 may include at least one of the metals niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion may be, or may include, niobium (Nb) or an alloy thereof. As one specific non-limiting example, the refractory portion may be, or may include, a niobium-hafnium-titanium alloy, such as C-103 niobium alloy. The refractory portion 122 may be formed by additive manufacturing.

A structural portion 124 is metallurgically joined with a surface of the refractory portion 122. The structural portion 124 may be deposited onto the refractory portion 122 by additive manufacturing to form a desired finished configuration. Any other suitable manufacturing process may be used to form the structural portion 124, such as by a laser weld from a selective laser melting process. The structural portion 124 has a second physical characteristic different from the first physical characteristic of the refractory portion 122. The second physical characteristic of the refractory portion 122M may include excellent strength, especially at elevated temperatures.

The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

The refractory portion 122 may then be machined to a finished desired configuration 122M, such as that illustrated in FIG. 4. The refractory portion 122 could be formed by additive manufacturing and supplied in a desired finished configuration 122M.

Figure 5:
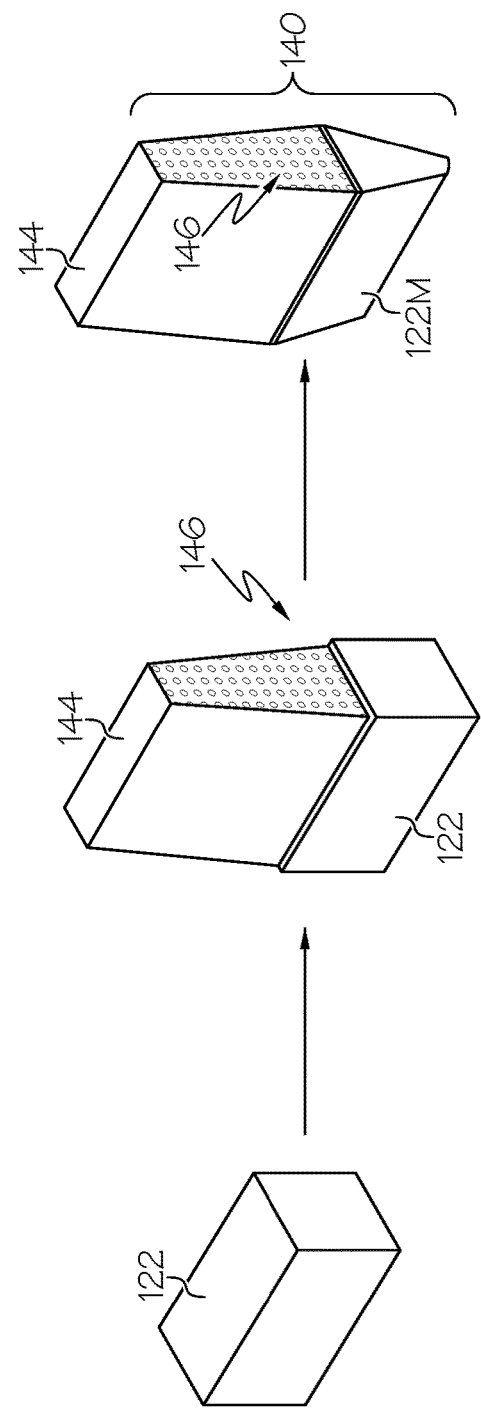

A multi-material structure 140 constructed according to another aspect is illustrated in FIG. 5. Such a multi-material structure 140 is intended for and suited for use in applications where relatively high strength and resistance to relatively elevated temperatures is desired or required. Thus, the multi-material structure 140 overcomes the disadvantages associated with previously known and available metals and alloys.

To construct the multi-material structure 140 (FIG. 5) a refractory portion 122 is formed or supplied. The refractory portion 122 has a first physical characteristic that may include excellent resistance to relatively high temperatures. The refractory portion may include at least one of the metals niobium (Nb), molybdenum (Mo), tantalum (Ta), tungsten (W), rhenium (Re), iridium (1r), vanadium (V), and ruthenium (Ru), and alloys thereof. As one general non-limiting example, the refractory portion may be, or may include, niobium (Nb) or an alloy thereof. As one specific non-limiting example, the refractory portion may be, or may include, a niobium-hafnium-titanium alloy, such as C-103 niobium alloy. The refractory portion 122 may be formed by additive manufacturing.

A structural portion 144 is metallurgically joined with a surface of the refractory portion 122. The structural portion 144 may be deposited onto the refractory portion 122 by additive manufacturing or any other suitable manufacturing process, such as by a laser weld from a selective laser melting process. The structural portion 144 has a second physical characteristic different from a physical characteristic of the refractory portion. The second physical characteristic of the structural portion 144 may include excellent strength, especially at elevated temperatures.

The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma. The structural portion 144 may be formed with a core having an open cell structure 146, such as an additive core having an open cell structure. The open cell structure 146 provides a multi-material structure 140 that is relatively lighter in weight and uses less material, thereby reducing material cost.

The refractory portion 122 may then be machined to a finished desired configuration 122M, such as that illustrated in FIG. 5. It should be noted that the refractory portion 122 could be formed by additive manufacturing and supplied in a desired finished configuration 122M.

A multi-material structure 220 constructed according to another aspect is illustrated in a lower portion of FIG. 6. Such a multi-material structure 220 is intended for and suitable for use in applications where relatively high strength and relatively elevated temperatures resistance is desired.

As above, to construct the multi-material structure 220 a refractory portion 122 is formed or supplied. The refractory portion 122 has a first physical characteristic that may include excellent resistance to relatively high temperatures. The refractory portion 122 may include at least one metal of niobium (Nb), molybdenum (Mo), tantalum (Ta), tungsten (W), rhenium (Re), iridium (Jr), vanadium (V), and ruthenium (Ru), and alloys thereof. As one general non-limiting example, the refractory portion 122 may be, or may include, niobium (Nb) or an alloy thereof. As one specific non-limiting example, the refractory portion 122 may be, or may include, a niobium-hafnium-titanium alloy, such as C-103 niobium alloy. The refractory portion 122 may be formed by additive manufacturing.

An interface portion 242 is bonded or metallurgically joined with the refractory portion 122. The interface portion 242 is located between and attaches the refractory portion 122 with a structural portion 124. The interface portion 242 is employed to better join the structural portion 124 with the refractory portion 122.

The interface portion 242 may be formed from a mixed composition (i.e., a heterogenous mixture) of the materials of the refractory portion 122 and structural portion 124. The interface portion 242 may be formed from a mixed composition powder (e.g., a blended alloy powder) deposited onto at least one of the refractory portion 122 and the structural portion 124.

The interface portion 242 may be formed by additive manufacturing or any other suitable process. The interface portion 242 may be constructed from the materials of the refractory portion 122 and of the structural portion 124. The interface portion 242 may be formed by functional grading additive manufacturing. The interface portion 242 may be constructed from a mixture of the materials of the refractory portion 122 and of the structural portion 144. The interface portion 242 may be deposited in layers of the different materials to establish a graded mixture of the materials. For example, layer by layer interface portion 242 would gradually transition from 100 percent of the materials of the structural portion 124 to 100 percent of the materials of the refractory portion 122.

The structural portion 124 is metallurgically joined with the interface portion 242 as illustrated by way of example in FIG. 6. The structural portion 124 is deposited onto the interface portion 242 by additive manufacturing or any other suitable manufacturing process, such as by a laser weld from a selective laser melting process. The structural portion 124 has a second physical characteristic different from a physical characteristic of the refractory portion 122. The second physical characteristic of the structural portion 124 may include excellent strength, especially at elevated temperatures.

The structural portion 124 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma.

The refractory portion 122 may then be formed or machined in a desired finished configuration 122M.

A multi-material structure 240 constructed according to another aspect is illustrated in a lower portion of FIG. 7. Such a multi-material structure 240 is intended for and suitable for use in applications where relatively high strength and relatively elevated temperatures resistance is desired.

To construct the multi-material structure 240, a refractory portion 122 is formed or supplied. The refractory portion 122 has a first physical characteristic that may include excellent resistance to relatively high temperatures. The refractory portion 122 may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 122 may be, or may include, niobium (Nb) or an alloy thereof. As one specific non-limiting example, the refractory portion 122 may be, or may include, a niobium-hafnium-titanium alloy, such as C-103 niobium alloy. The refractory portion 122 may be formed by additive manufacturing.

An interface portion 242 is bonded or metallurgically joined with the refractory portion 122. The interface portion 242 is located between and attaches the refractory portion 122 with a structural portion 144. The interface portion 242 is employed to better join the refractory portion 122 with a structural portion 144.

The interface portion 242 may be formed from a mixed composition of the materials of the refractory portion 122 and structural portion 144. The interface portion 242 may be formed from a mixed composition powder deposited onto at least one of the refractory portion 122 and the structural portion 144.

The interface portion 242 may be formed by additive manufacturing or any other suitable process. The interface portion 242 may be constructed from the materials of the refractory portion 122 and of the structural portion 144. The interface portion 242 may be formed by functional grading additive manufacturing. The interface portion 242 may be constructed from a mixture of the materials of the refractory portion 122 and of the structural portion 144. The interface portion 242 may be deposited in layers of the different materials to establish a graded mixture of the materials. For example, layer by layer would gradually transition from 100 percent of the materials of the structural portion 144 to 100 percent of the materials of the refractory portion 122.

The structural portion 144 is metallurgically joined with a surface of interface portion 242. The structural portion 144 may be deposited onto the interface portion 242 by additive manufacturing or any other suitable manufacturing process, such as by a laser weld from a selective laser melting process. The structural portion 144 has a second physical characteristic different from a physical characteristic of the structural portion 124. The second physical characteristic of the structural portion 144 may include excellent strength, especially at elevated temperatures.

The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma.

The structural portion 144 may be formed with a core having an open cell structure 146, such as an additive core having an open cell structure. The open cell structure 146 provides a multi-material structure 240 that is relatively light in weight and uses less material, thereby reducing material cost.

The refractory portion 122 may then be formed and supplied in a desired finished configuration 122M.

A multi-material structure 320 constructed according to another aspect is illustrated in an upper portion of FIG. 8. Such a multi-material structure 320 is intended for and suitable for use in applications where relatively high strength and resistance to relatively elevated temperatures is desired or required.

To construct the multi-material structure 320 a refractory portion 122M is formed by additive manufacturing or any other suitable process. The refractory portion 122M is formed in a substantially finished desired configuration, such as that illustrated in FIG. 8.

The refractory portion 122M has a first physical characteristic that may include excellent resistance to relatively high temperatures. The refractory portion 122M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 122M may be, or may include, niobium (Nb) or an alloy thereof. As one specific non-limiting example, the refractory portion 122M may be, or may include, a niobium-hafnium-titanium alloy, such as C-103 niobium alloy. The refractory portion 122M may be formed by additive manufacturing.

A structural portion 124 is metallurgically joined directly to the refractory portion 122M. The structural portion 124 may be deposited onto the refractory portion 122M by additive manufacturing or any other suitable manufacturing process, such as by a laser weld from a selective laser melting process. The structural portion 124 has a second physical characteristic different from a physical characteristic of the refractory portion 122M. The second physical characteristic of the structural portion 124 may include excellent strength, especially at elevated temperatures.

The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A multi-material structure 340 constructed according to another aspect is illustrated in a lower portion of FIG. 8. Such a multi-material structure 340 is intended for and suitable for use in applications where relatively high strength and relatively resistance to elevated temperatures is desired or required.

To construct the multi-material structure 340 (FIG. 8) a refractory portion 122M is formed by additive manufacturing or any other suitable process. The refractory portion 122M is formed in a substantially finished desired configuration, such as that illustrated in FIG. 8.

A structural portion 144 is metallurgically joined with a surface of the refractory portion 122M. The structural portion 144 may be deposited directly onto the refractory portion 122M by additive manufacturing or any other suitable manufacturing process, such as by a laser weld from a selective laser melting process. The structural portion 144 has a second physical characteristic different from a physical characteristic of the refractory portion 122M. The second physical characteristic of the structural portion 144 may include excellent strength, especially at elevated temperatures. The structural portion 144 may also be formed by additive manufacturing or any other suitable manufacturing process.

The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma. The structural portion 144 may be formed with a core having an open cell structure 146, such as an additive core having an open cell structure. The open cell structure 146 provides a multi-material structure 340 that is relatively light in weight and uses less material, thereby reducing material cost.

A multi-material structure 360 constructed according to another aspect is illustrated in an upper portion of FIG. 9. Such a multi-material structure 360 is intended for and suitable for use in applications where relatively high strength and relatively elevated temperatures resistance is desired.

To construct the multi-material structure 360 (FIG. 9) a refractory portion 364M may be formed by additive manufacturing or any other suitable process. The refractory portion 364M is formed in a substantially desired finished configuration, such as that illustrated in FIG. 9.

The refractory portion 364M has a first physical characteristic that may include excellent resistance to relatively high temperatures. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M may be formed with a core having an open cell structure 366, such as an additive core having an open cell structure. The open cell structure 366 provides a multi-material structure 360 that is relatively light in weight and uses less material, thereby reducing material cost.

A structural portion 124 is metallurgically joined with a surface of the refractory portion 364M. The structural portion 124 may be deposited directly onto the refractory portion 364M by additive manufacturing or any other suitable manufacturing process, such as by a laser weld from a selective laser melting process. The refractory portion 122M has a second physical characteristic different from a physical characteristic of the refractory portion 364M. The second physical characteristic of the refractory portion 122M may include excellent strength, especially at elevated temperatures.

The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A multi-material structure 380 constructed according to another aspect is illustrated in a lower portion of FIG. 9. Such a multi-material structure 380 is intended for and suitable for use in applications where relatively high strength and relatively elevated temperatures resistance is desired.

To construct the multi-material structure 380 (FIG. 9) a refractory portion 364M is formed by additive manufacturing or any other suitable process. The refractory portion 364M is formed in a substantially finished desired configuration, such as that illustrated in FIG. 9.

The refractory portion 364M has a first physical characteristic that may include excellent resistance to relatively high temperatures. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M may be formed with a core having an open cell structure 366, such as an additive core having an open cell structure. The open cell structure 366 provides a multi-material structure 380 that is relatively light in weight and uses less material, thereby reducing material cost.

A structural portion 144 is metallurgically joined with a surface of the refractory portion 364M. The structural portion 144 may be deposited directly onto the refractory portion 364M by additive manufacturing or any other suitable manufacturing process, such as by a laser weld from a selective laser melting process. The structural portion 144 has a second physical characteristic different from a physical characteristic of the refractory portion. The second physical characteristic of the structural portion 144 may include excellent strength, especially at elevated temperatures. The structural portion 144 may also be formed by additive manufacturing or any other suitable manufacturing process.

The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma. The structural portion 144 may be formed with a core having an open cell structure 146, such as an additive core having an open cell structure. The open cell structure 146 provides a multi-material structure 140 that is relatively light in weight and uses less material, thereby reducing material cost.

A multi-material structure 420 constructed according to another aspect is illustrated in in an upper portion of FIG. 10. Such a multi-material structure 420 is intended for and suitable for use in applications where relatively high strength and relatively elevated temperatures resistance is desired.

To construct the multi-material structure 420 illustrated in FIG. 10, a refractory portion 122M is formed or supplied. The refractory portion 122M has a first physical characteristic that may include excellent resistance to relatively high temperatures. The refractory portion 122M may include at least one metal of niobium (Nb), molybdenum (Mo), tantalum (Ta), tungsten (W), rhenium (Re), iridium (Jr), vanadium (V), and ruthenium (Ru), and alloys thereof. As one general non-limiting example, the refractory portion 122M may be, or may include, niobium (Nb) or an alloy thereof. As one specific non-limiting example, the refractory portion 122M may be, or may include, a niobium-hafnium-titanium alloy, such as C-103 niobium alloy. The refractory portion 122M may be formed by additive manufacturing. The refractory portion 122M is preferably formed in a substantially finished desired configuration, such as that illustrated in FIG. 10.

An interface portion 442 is metallurgically joined with the refractory portion 122M. The interface portion 442 is located between and attaches a structural portion 124 with the refractory portion 122M. The interface portion 442 may be employed to metallurgically join the structural portion 124 with the refractory portion 122M.

The interface portion 442 may be derived from a mixed composition of the materials of the structural portion 124 and refractory portion 122M. The interface portion 442 may be formed by additive manufacturing or any other suitable process. The interface portion 442 may be constructed from the materials of the structural portion 124 and/or of the refractory portion 122M. The interface portion 442 may be formed by functional grading additive manufacturing. The interface portion 442 may be constructed from a mixture of the materials of the structural portion 124 and of the refractory portion 122M. The interface portion 442 may be deposited in layers of the different materials to establish a graded mixture of the materials. For example, layer by layer would gradually transition from 100 percent of the materials of the structural portion 124 to 100 percent of the materials of the refractory portion 122M. Other functional grading processes can be utilized.

The structural portion 124 is metallurgically joined with the interface portion 442 as illustrated by way of example in FIG. 10. The structural portion 124 may be deposited directly onto the interface portion 442 by additive manufacturing or any other suitable manufacturing process, such as by a laser weld from a selective laser melting process. The structural portion 124 has a second physical characteristic different from a physical characteristic of the structural portion 124. The second physical characteristic of the structural portion 124 may include excellent strength, especially at elevated temperatures. The structural portion 124 may also be formed by additive manufacturing or any other suitable manufacturing process into a desired finished configuration.

The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A multi-material structure 440 constructed according to another aspect is illustrated in a lower portion of FIG. 10. Such a multi-material structure 440 is intended for and suitable for use in applications where relatively high strength and relatively elevated temperatures resistance is desired.

As above, to construct the multi-material structure 440 a refractory portion 122M is formed or supplied. The refractory portion 122M has a first physical characteristic that may include excellent resistance to relatively high temperatures. The refractory portion 122 is preferably formed and supplied in a desired finished configuration 122M. The refractory portion 122M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 122M may be, or may include, niobium (Nb) or an alloy thereof. As one specific non-limiting example, the refractory portion 122M may be, or may include, a niobium-hafnium-titanium alloy, such as C-103 niobium alloy. The refractory portion 122M may be formed by additive manufacturing.

An interface portion 442 is bonded or metallurgically joined with the refractory portion 122M. The interface portion 442 is located between and attaches the refractory portion 122M with the structural portion 144. The interface portion 442 is employed to better join the structural portion 124 with the refractory portion 122M.

The interface portion 442 may be formed from a mixed composition of the materials of the refractory portion 122M and structural portion 144. The interface portion 442 may be formed from a mixed composition powder deposited onto at least one of the structural portion 124 and the refractory portion 122M.

The interface portion 442 may be formed by additive manufacturing or any other suitable process. The interface portion 442 may be constructed from the materials of the refractory portion 122M and of the structural portion 144. The interface portion 442 may be constructed from the materials of the refractory portion 122M and of the structural portion 144. The interface portion 442 may be formed by functional grading additive manufacturing. The interface portion 442 may be constructed from a mixture of the materials of the refractory portion 122M and of the structural portion 144. The interface portion 442 may be deposited in layers of the different materials to establish a graded mixture of the materials. For example, layer by layer would gradually transition from 100 percent of the materials of the refractory portion 122M to 100 percent of the materials of the structural portion 144.

The structural portion 144 is metallurgically joined with a surface of interface portion 442. The structural portion 144 may be deposited onto the interface portion 442 by additive manufacturing or any other suitable manufacturing process, such as by a laser weld from a selective laser melting process. The structural portion 144 has a second physical characteristic different from a physical characteristic of the refractory portion 122M. The second physical characteristic of the structural portion 144 may include excellent strength, especially at elevated temperatures.

The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma.

The structural portion 144 may be formed with a core having an open cell structure 146, such as an additive core having an open cell structure. The open cell structure 146 provides a multi-material structure 440 that is relatively light in weight and uses less material, thereby reducing material cost.

A multi-material structure 460 constructed according to another aspect is illustrated in an upper portion of FIG. 11. Such a multi-material structure 460 is intended for and suitable for use in applications where relatively high strength and relatively elevated temperatures resistance is desired.

To construct the multi-material structure 460 illustrated in FIG. 11, a refractory portion 364M is formed or supplied. The refractory portion 364M has a first physical characteristic that may include excellent resistance to relatively high temperatures. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M may be formed by additive manufacturing.

The refractory portion 364M is preferably formed and supplied in a desired finished configuration. The refractory portion 364M may be formed with a core having an open cell structure 366, such as an additive core having an open cell structure. The open cell structure 366 provides a multi-material structure 460 that is relatively light in weight and uses less material, thereby reducing material cost.

An interface portion 442 is metallurgically joined with the refractory portion 364M. The interface portion 442 is located between and attaches the refractory portion 364M with a structural portion 124. The interface portion 442 may be formed from a mixed composition of the materials of the structural portion 124 and refractory portion 364M. The interface portion 442 may be formed from a mixed composition powder deposited onto at least one of the structural portion 124 and the refractory portion 364M.

The interface portion 442 may be formed by additive manufacturing or any other suitable process. The interface portion 442 may be constructed from the materials of the refractory portion 364M and of the structural portion 124. The interface portion 442 may be constructed from the materials of the refractory portion 364M and of the refractory portion 364M. The interface portion 442 may be formed by functional grading additive manufacturing. Functionally Graded Additive Manufacturing (FGAM) is a layer-by-layer fabrication process that involves gradationally varying the material composition within a component to achieve an intended function.

The interface portion 442 may be constructed from a mixture of the materials of the refractory portion 364M and of the structural portion 124. The interface portion 442 may be deposited in layers of the different materials to establish a graded mixture of the materials. For example, layer by layer would gradually transition from 100 percent of the materials of the refractory portion 364M to 100 percent of the materials of the structural portion 124.

The structural portion 124 is metallurgically bonded or joined with a surface of interface portion 442 as illustrated by way of example in FIG. 11. The structural portion 124 may be deposited onto the interface portion 442 by additive manufacturing or any other suitable manufacturing process, such as by a laser weld from a selective laser melting process. The structural portion 124 has a second physical characteristic different from a physical characteristic of the refractory portion 364M. The second physical characteristic of the structural portion 124 may include excellent strength, especially at elevated temperatures. The structural portion 124 may also be formed by additive manufacturing or any other suitable manufacturing process.

The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A multi-material structure 480 constructed according to another aspect is illustrated in in the lower portion of FIG. 11. Such a multi-material structure 480 is intended for and suitable for use in applications where relatively high strength and relatively elevated temperatures resistance is desired.

To construct the multi-material structure 480 illustrated in FIG. 11, a refractory portion 364M is formed or supplied. The refractory portion 364M has a first physical characteristic that may include excellent resistance to relatively high temperatures. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M may be formed by additive manufacturing. The refractory portion 364M is preferably formed and supplied in a desired finished configuration. The refractory portion 364M may be formed with a core having an open cell structure 366, such as an additive core having an open cell structure. The open cell structure 366 provides a multi-material structure 480 that is relatively light in weight and uses less material, thereby reducing material cost.

A structural portion 144 is to be operationally connected with the refractory portion 364M. The structural portion 144 may be formed by additive manufacturing or any other suitable manufacturing process. The structural portion 144 may be formed with a core having an open cell structure 146, such as an additive core having an open cell structure. The open cell structure 146 provides a multi-material structure 480 that is relatively light in weight and uses less material, thereby reducing material cost. The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma.

An interface portion 442 is metallurgically joined with the refractory portion 364M. The interface portion 442 is located between and attaches the refractory portion 364M with the structural portion 144. The interface portion 442 is employed to provide a relatively smooth transition between the materials of the refractory portion 364M to the with the structural portion 144.

The interface portion 442 may be formed by additive manufacturing or any other suitable process. The interface portion 442 may be constructed from the materials of the refractory portion 364M and of the structural portion 144.

The interface portion 442 may be constructed from the materials of the refractory portion 364M and of the structural portion 144. The interface portion 442 may be formed by functional grading additive manufacturing. The interface portion 442 may be constructed from a mixture of the materials of the refractory portion 364M and of the structural portion 144. The interface portion 442 may be deposited in layers of the different materials to establish a graded mixture of the materials. For example, layer by layer would gradually transition from 100 percent of the materials of the refractory portion 364M to 100 percent of the materials of the structural portion 144.

The structural portion 144 is metallurgically joined with a surface of interface portion 442 as illustrated by way of example in FIG. 11. The structural portion 144 may be directly deposited onto the interface portion 442 by additive manufacturing or any other suitable manufacturing process, such as by a laser weld from a selective laser melting process. The structural portion 144 has a second physical characteristic different from the first physical characteristic of the refractory portion 364M. The second physical characteristic of the structural portion 144 may include excellent strength, especially at elevated temperatures.

A multi-material structure 520 constructed according to another aspect is illustrated in an upper portion of FIG. 12. Such a multi-material structure 520 is intended for and suitable for use in applications where relatively high strength and relatively good resistance to elevated temperatures is desired.

To construct the multi-material structure 520 illustrated in FIG. 12, a structural portion 124 is formed or supplied. The structural portion 124 has a physical characteristic that may include excellent strength, especially at elevated temperatures. The structural portion 124 may be formed by additive manufacturing or any other suitable manufacturing process. The structural portion 124 is preferably formed and supplied in a desired finished configuration.

The structural portion 124 may include, for example, at least one of Ti-6Al-4V, Ti-6Al-2Sn-4Zr-2Mo, and TiAl. The refractory portion 122M may include a titanium alloy in a phase of at least one of a near-alpha, alpha-beta, near-beta, beta, and gamma.

A refractory portion 122M is metallurgically joined with the structural portion 124 as illustrated by way of example in FIG. 12. The refractory portion 122M may be formed by additive manufacturing or any other suitable manufacturing process, such as by a laser weld from a selective laser melting process. The refractory portion 122M has another physical characteristic different from a physical characteristic of the structural portion 124. The other physical characteristic of the structural portion 124 may include excellent resistance to elevated temperatures. The refractory portion 122M may also be formed by additive manufacturing or any other suitable manufacturing process. The refractory portion 122M may be formed by additive manufacturing or any other suitable manufacturing process. The refractory portion 122M is preferably formed and supplied in a desired finished configuration.

A multi-material structure 540 constructed according to another aspect is illustrated in a lower portion of FIG. 12. Such a multi-material structure 540 is intended for and suitable for use in applications where relatively high strength and relatively elevated temperatures resistance is desired.

To construct the multi-material structure 540 illustrated in FIG. 12, a structural portion 124 is formed or supplied. The structural portion 124 has a physical characteristic that may include excellent strength, especially at elevated temperatures. The structural portion 124 may be formed by additive manufacturing or any other suitable manufacturing process. The structural portion 124 is preferably formed and supplied in a desired finished configuration.

A refractory portion 364M is metallurgically joined with the refractory portion 122M as illustrated by way of example in FIG. 12. The refractory portion 364M may be deposited onto the structural portion 124 by additive manufacturing or any other suitable manufacturing process, such as by a laser weld from a selective laser melting process. The refractory portion 364M has another physical characteristic different from a physical characteristic of the structural portion 124. The other physical characteristic of the refractory portion 364M may include excellent strength, especially at elevated temperatures.

The refractory portion 364M may also be formed by additive manufacturing or any other suitable manufacturing process. The refractory portion 364M is preferably formed and supplied in a desired configuration. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M may be formed with a core having an open cell structure 366, such as an additive core having an open cell structure. The open cell structure 366 provides a multi-material structure 540 that is relatively light in weight and uses less material, thereby reducing material cost.

A multi-material structure 560 constructed according to another aspect is illustrated in an upper portion of FIG. 13. Such a multi-material structure 560 is intended for and suitable for use in applications where relatively high strength and relatively good resistance to elevated temperatures is desired.

To construct the multi-material structure 560 illustrated in FIG. 13, a structural portion 144 is formed or supplied. The structural portion 144 has a physical characteristic that may include excellent strength, especially at elevated temperatures. The structural portion 144 may be formed by additive manufacturing or any other suitable manufacturing process. The structural portion 144 is preferably formed and supplied in a desired finished configuration.

The structural portion 144 is preferably formed with a core having an open cell structure 146, such as an additive core having an open cell structure. The open cell structure 146 provides a multi-material structure 560 that is relatively light in weight and uses less material, thereby reducing material cost. The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma.

A refractory portion 122M is metallurgically joined with the structural portion 144 as illustrated by way of example in FIG. 13. The refractory portion 122M may be formed by additive manufacturing or any other suitable manufacturing process, such as by a laser weld from a selective laser melting process. The refractory portion 122M has another physical characteristic different from a physical characteristic of the structural portion 144. The other physical characteristic of the refractory portion 122M may include excellent resistance to elevated temperatures. The refractory portion 122M is preferably formed and supplied in a desired finished configuration.

A multi-material structure 580 constructed according to another aspect is illustrated in a lower portion of FIG. 13. Such a multi-material structure 580 is intended for and suitable for use in applications where relatively high strength and relatively good resistance to elevated temperatures is desired.

To construct the multi-material structure 580 illustrated in FIG. 13, a structural portion 144 is formed or supplied. The structural portion 144 has a physical characteristic that may include excellent strength, especially at elevated temperatures. The structural portion 144 may be formed by additive manufacturing or any other suitable manufacturing process. The structural portion 144 is preferably formed and supplied in a desired finished configuration.

The structural portion 144 is preferably formed with a core having an open cell structure 146, such as an additive core having an open cell structure. The open cell structure 146 provides a multi-material structure 560 that is relatively light in weight and uses less material, thereby reducing material cost. The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma.

A refractory portion 364M is metallurgically joined with the structural portion 144 as illustrated by way of example in FIG. 13. The refractory portion 364M may be deposited structural portion 144 by additive manufacturing or any other suitable manufacturing process, such as by a laser weld from a selective laser melting process. The refractory portion 364M has another physical characteristic different from a physical characteristic of the structural portion 144. The other physical characteristic of the refractory portion 364M may include resistance to elevated temperatures that may result in damage or degradation of a desired property.

The refractory portion 364M may also be formed by additive manufacturing or any other suitable manufacturing process. The refractory portion 364M is preferably formed and supplied in a desired configuration. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M is preferably formed and supplied in a desired finished configuration. The refractory portion 364M may be formed with a core having an open cell structure 366, such as an additive core having an open cell structure. The open cell structure 366 provides a multi-material structure 560 that is relatively light in weight and uses less material, thereby reducing material cost.

A multi-material structure 620 constructed according to another aspect is illustrated in in an upper portion of FIG. 14. The multi-material structure 620 is intended for and suitable for use in applications where relatively high strength and relatively elevated temperatures resistance is desired.

To construct the multi-material structure 620 illustrated in FIG. 14, a structural portion 124 is formed or supplied. The structural portion 124 has a physical characteristic that may include excellent strength, especially at elevated temperatures. The structural portion 124 may be formed by additive manufacturing or any other suitable manufacturing process. The structural portion 124 is preferably formed and supplied in a desired finished configuration.

The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A refractory portion 122M is metallurgically joined with the structural portion 124 as illustrated by way of example in FIG. 14. The refractory portion 122M may be formed by additive manufacturing or any other suitable manufacturing process, such as by a laser weld from a selective laser melting process. The refractory portion 122M has another physical characteristic different from a physical characteristic of the structural portion 124. The other physical characteristic of the refractory portion 122M may include excellent resistance to elevated temperatures.

The refractory portion 122M may also be formed by additive manufacturing or any other suitable manufacturing process. The refractory portion 122M may be formed by additive manufacturing or any other suitable manufacturing process. The refractory portion 122M is preferably formed and supplied in a desired finished configuration. The refractory portion 122M may include at least one of the metals niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 122M may be, or may include, niobium (Nb) or an alloy thereof. As one specific non-limiting example, the refractory portion 122M may be, or may include, a niobium-hafnium-titanium alloy, such as C-103 niobium alloy. The refractory portion 122M may be formed by additive manufacturing.

An interface portion 442 is metallurgically joined with the structural portion 124. The interface portion 442 is located between and attaches the structural portion 124 with the refractory portion 122M. The interface portion 442 may be employed to join the structural portion 124 to the with the refractory portion 122M.

The interface portion 442 may be derived from a mixed composition of the materials of the structural portion 124 and refractory portion 122M. The interface portion 442 may be formed by additive manufacturing or any other suitable process. The interface portion 442 may be constructed from the materials of the structural portion 124 and/or of the refractory portion 122M. The interface portion 442 may be formed by functional grading additive manufacturing. The interface portion 442 may be constructed from a mixture of the materials of the structural portion 124 and of the refractory portion 122M. The interface portion 442 may be deposited in layers of the different materials to establish a graded mixture of the materials. For example, layer by layer would gradually transition from 100 percent of the materials of the structural portion 124 to 100 percent of the materials of the refractory portion 122M. Other functional grading processes can be utilized.

The refractory portion 122M is metallurgically joined with the interface portion 442 as illustrated by way of example in FIG. 14. The refractory portion 122M may be deposited onto the interface portion 442 by additive manufacturing or any other suitable manufacturing process, such as by a laser weld from a selective laser melting process. The refractory portion 122M may also be formed by additive manufacturing or any other suitable manufacturing process.

A multi-material structure 640 constructed according to another aspect is illustrated in a lower portion of FIG. 14. Such a multi-material structure 640 is intended for and suitable for use in applications where relatively high strength and relatively elevated temperatures resistance is desired.

To construct the multi-material structure 640 a structural portion 124 is formed or supplied. The structural portion 124 has a physical characteristic that may include excellent strength, especially at elevated temperatures. The structural portion 124 is preferably formed and supplied in a desired finished configuration. The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A refractory portion 364M is metallurgically joined with the refractory portion 122M as illustrated by way of example in FIG. 14. The refractory portion 364M may be deposited onto the structural portion 124 by additive manufacturing or any other suitable manufacturing process, such as by a laser weld from a selective laser melting process. The refractory portion 364M has another physical characteristic different from a physical characteristic of the structural portion 124. The other physical characteristic of the refractory portion 364M may include excellent resistance to elevated temperatures that may result in damage or degradation of a desired property.

The refractory portion 364M may also be formed by additive manufacturing or any other suitable manufacturing process. The refractory portion 364M is preferably formed and supplied in a desired configuration. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M may be formed with a core having an open cell structure 366, such as an additive core having an open cell structure. The open cell structure 366 provides a multi-material structure 540 that is relatively light in weight and uses less material, thereby reducing material cost.

An interface portion 442 is bonded or metallurgically joined with the structural portion 124. The interface portion 442 is located between and attaches the structural portion 124 with the refractory portion 364M. The interface portion 442 is employed to better join the structural portion 124 to the with the refractory portion 364M. The interface portion 442 may be formed from a mixed composition of the materials of the structural portion 124 and refractory portion 364M. The interface portion 442 may be formed from a mixed composition powder deposited onto at least one of the structural portion 124 and the refractory portion 364M.

The interface portion 442 may be formed by additive manufacturing or any other suitable process. The interface portion 442 may be constructed from the materials of the structural portion 124 and of the refractory portion 364M. The interface portion 442 may be formed by functional grading additive manufacture. The interface portion 442 may be constructed from a mixture of the materials of the refractory portion 364M and of the structural portion 124. The interface portion 442 may be deposited in layers of the different materials to establish a graded mixture of the materials. For example, layer by layer would gradually transition from 100 percent of the materials of the structural portion 124 to 100 percent of the materials of the refractory portion 364M.

The refractory portion 364M is metallurgically joined with a surface of interface portion 442. The refractory portion 364M may be deposited onto the interface portion 442 by additive manufacturing or any other suitable manufacturing process, such as by a laser weld from a selective laser melting process. The refractory portion 364M has another physical characteristic different from a physical characteristic of the structural portion 124. The other physical characteristic of the refractory portion 364M may include excellent resistance to elevated temperatures that may result in damage or degradation of a desired property. The refractory portion 364M may be formed with a core having an open cell structure 366, such as an additive core having an open cell structure. The open cell structure 366 provides a multi-material structure 640 that is relatively light in weight and uses less material, thereby reducing material cost.

A multi-material structure 660 constructed according to another aspect is illustrated in an upper portion of FIG. 15. Such a multi-material structure 660 is intended for and suitable for use in applications where relatively high strength and relatively elevated temperatures resistance is desired.

To construct the multi-material structure 660 illustrated in FIG. 15, a structural portion 144 is formed or supplied. The structural portion 144 has a physical characteristic that may include excellent strength, especially at elevated temperatures.

The structural portion 144 is preferably formed and supplied in a desired finished configuration. The structural portion 144 may be formed with a core having an open cell structure 146, such as an additive core having an open cell structure. The open cell structure 146 provides a multi-material structure 660 that is relatively light in weight and uses less material, thereby reducing material cost.

The structural portion 144 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

An interface portion 442 is metallurgically joined with the structural portion 144. The interface portion 442 is located between and attaches the structural portion 144 with a refractory portion 122M. The interface portion 442 may be formed from a mixed composition of the materials of the structural portion 144 and refractory portion 122M. The interface portion 442 may be formed from a mixed composition powder deposited onto at least one of the structural portion 144 and the refractory portion 122M.

The interface portion 442 may be formed by additive manufacturing or any other suitable process. The interface portion 442 may be constructed from the materials of the structural portion 144 and of the refractory portion 122M. The interface portion 442 may be formed by functional grading additive manufacturing. The interface portion 442 may be deposited in layers of the different materials to establish a graded mixture of the materials. For example, layer by layer would gradually transition from 100 percent of the materials of the structural portion 144 to 100 percent of the materials of the refractory portion 122M.

The refractory portion 122M is metallurgically bonded or joined with a surface of interface portion 442 as illustrated by way of example in FIG. 15. The refractory portion 122M may be deposited onto the interface portion 442 by additive manufacturing or any other suitable manufacturing process, such as by a laser weld from a selective laser melting process. The refractory portion 122M has a second physical characteristic different from a physical characteristic of the structural portion 144. The second physical characteristic of the refractory portion 122M may include excellent resistance to elevated temperatures that may result in damage or degradation of a desired property.

The refractory portion 122M may also be formed by additive manufacturing or any other suitable manufacturing process. The refractory portion 122M is preferably formed and supplied in a desired finished configuration. The refractory portion 122M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 122M may be, or may include, niobium (Nb) or an alloy thereof. As one specific non-limiting example, the refractory portion 122M may be, or may include, a niobium-hafnium-titanium alloy, such as C-103 niobium alloy.

A multi-material structure 680 constructed according to another aspect is illustrated in in the lower portion of FIG. 15. The multi-material structure 680 is intended for and suitable for use in applications where relatively high strength and relatively elevated temperatures resistance is desired.

To construct the multi-material structure 680 illustrated in FIG. 15, a structural portion 144 is formed or supplied. The structural portion 144 may be formed by additive manufacturing or any other suitable manufacturing process. The structural portion 144 may be formed with a core having an open cell structure 146, such as an additive core having an open cell structure. The open cell structure 146 provides a multi-material structure 680 that is relatively light in weight and uses less material, thereby reducing material cost. The structural portion 144 may include, for example, at least one of Ti-6Al-4V, Ti-6Al-2Sn-4Zr-2Mo, and TiAl. The structural portion 144 may include a titanium alloy in a phase of at least one of a near-alpha, alpha-beta, near-beta, beta, and gamma.

An interface portion 442 is metallurgically joined with the structural portion 144. The interface portion 442 is located between and attaches the structural portion 144 with a refractory portion 364M. The interface portion 442 may be formed from a mixed composition of the materials of the structural portion 144 and a refractory portion 364M The interface portion 442 may be formed by additive manufacturing or any other suitable process. The interface portion 442 may be constructed from the materials of the structural portion 144 and of the refractory portion 364M. The interface portion 442 may be formed by functional grading additive manufacturing. The interface portion 442 may be deposited in layers of the different materials to establish a graded mixture of the materials. For example, layer by layer would gradually transition from 100 percent of the materials of the structural portion 144 to 100 percent of the materials of the refractory portion 364M.

The refractory portion 364M is formed or supplied. The refractory portion 364M has another physical characteristic different from a physical characteristic of the structural portion 144. The refractory portion 364M has a physical characteristic that may include excellent resistance to relatively high temperatures. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M may be formed by additive manufacturing. The refractory portion 364M is preferably formed and supplied in a desired finished configuration. The refractory portion 364M may be formed with a core having an open cell structure 366, such as an additive core having an open cell structure. The open cell structure 366 provides a multi-material structure 680 that is relatively light in weight and uses less material, thereby reducing material cost.

The refractory portion 364M is metallurgically joined with a surface of interface portion 442 as illustrated by way of example in FIG. 15. The refractory portion 364M may be deposited onto the interface portion 442 by additive manufacturing or any other suitable manufacturing process, such as by a laser weld from a selective laser melting process A multi-material structure 720 constructed according to another aspect is illustrated in an upper portion of FIG. 16. Such a multi-material structure 720 is intended for and suitable for use in applications where relatively high strength and relatively good resistance to elevated temperatures is desired.

To construct the multi-material structure 720 a structural portion 124 is formed or provided. The structural portion 124 may be formed by additive manufacturing or any other suitable process. The structural portion 124 is formed in a substantially finished desired configuration, such as that illustrated in FIG. 16.

The structural portion 124 has a first physical characteristic may include excellent strength, especially at elevated temperatures. The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A refractory portion 122M is metallurgically joined with a surface of the structural portion 124. The refractory portion 122M is additively manufactured directly onto the structural portion 124. The refractory portion 122M has a second physical characteristic different from a physical characteristic of the structural portion 124. The second physical characteristic of the refractory portion 122M may include excellent resistance to elevated temperatures that may result in damage or degradation of a desired property.

The refractory portion 122M may include at least one metal of niobium (Nb), molybdenum (Mo), tantalum (Ta), tungsten (W), rhenium (Re), iridium (Jr), vanadium (V), and ruthenium (Ru), and alloys thereof. As one general non-limiting example, the refractory portion 122M may be, or may include, niobium (Nb) or an alloy thereof. As one specific non-limiting example, the refractory portion 122M may be, or may include, a niobium-hafnium-titanium alloy, such as C-103 niobium alloy.

A multi-material structure 740 constructed according to another aspect is illustrated in a lower portion of FIG. 16. Such a multi-material structure 740 is intended for and suitable for use in applications where relatively high strength and relatively good resistance to elevated temperatures is desired.

To construct the multi-material structure 740 illustrated in FIG. 16, a structural portion 124 is formed or provided. The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma. The structural portion 124 is formed by additive manufacturing or any other suitable process. The structural portion 124 is formed in a substantially finished desired configuration, such as that illustrated in FIG. 16. The structural portion 124 has a first physical characteristic may include excellent strength, especially at elevated temperatures.

A refractory portion 364M is provided. The refractory portion 364M has a physical characteristic that may include excellent resistance to elevated temperatures that could result in damage or degradation of a desired property. The refractory portion 364M may be formed by additive manufacturing or any other suitable manufacturing process. The refractory portion 364M is preferably formed into a desired finished configuration during additive manufacturing.

The refractory portion 364M is metallurgically joined with a surface of the structural portion 124. The refractory portion 364M is additively manufactured directly onto the structural portion 124. The refractory portion 364M has a physical characteristic different from a physical characteristic of the structural portion 124. The physical characteristic of the refractory portion 364M may include excellent resistance to elevated temperatures that may result in damage or degradation of a desired property.

The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M is preferably formed with a core having an open cell structure 366, such as an additive core having an open cell structure. The open cell structure 366 provides a multi-material structure 360 that is relatively light in weight and uses less material, thereby reducing material cost.

A multi-material structure 820 constructed according to another aspect is illustrated in in an upper portion of FIG. 17. Such a multi-material structure 820 is intended for and suitable for use in applications where relatively high strength and relatively elevated temperatures resistance is desired.

To construct the multi-material structure 820 illustrated in FIG. 17, a structural portion 124 is formed or supplied. The structural portion 124 has a physical characteristic that may include excellent strength, especially at elevated temperatures. The structural portion 124 may be formed by additive manufacturing or any other suitable manufacturing process. The structural portion 124 is preferably formed and supplied in a desired finished configuration.

The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A refractory portion 122M is metallurgically joined with the structural portion 124 as illustrated by way of example in FIG. 17. The refractory portion 122M may be formed by additive manufacturing or any other suitable manufacturing process, such as by a laser weld from a selective laser melting process. The refractory portion 122M has another physical characteristic different from a physical characteristic of the structural portion 124. The other physical characteristic of the refractory portion 122M may include excellent resistance to elevated temperatures.

The refractory portion 122M may also be formed by additive manufacturing or any other suitable manufacturing process. The refractory portion 122M is preferably formed and supplied in a desired finished configuration. The refractory portion 122M may include at least one of the metals niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 122M may be, or may include, niobium (Nb) or an alloy thereof. As one specific non-limiting example, the refractory portion 122M may be, or may include, a niobium-hafnium-titanium alloy, such as C-103 niobium alloy. The refractory portion 122M may be formed by additive manufacturing.

An interface portion 442 is metallurgically joined with the structural portion 124. The interface portion 442 is located between and attaches the structural portion 124 with the refractory portion 122M. The interface portion 442 may be employed to join the structural portion 124 to the with the refractory portion 122M.

The interface portion 442 may be derived from a mixed composition of the materials of the structural portion 124 and refractory portion 122M. The interface portion 442 may be formed by additive manufacturing or any other suitable process. The interface portion 442 may be constructed from the materials of the structural portion 124 and/or of the refractory portion 122M. The interface portion 442 may be formed by functional grading additive manufacturing. The interface portion 442 may be constructed from a mixture of the materials of the structural portion 124 and of the refractory portion 122M. The interface portion 442 may be deposited in layers of the different materials to establish a graded mixture of the materials. For example, layer by layer would gradually transition from 100 percent of the materials of the structural portion 124 to 100 percent of the materials of the refractory portion 122M. Other functional grading processes can be utilized.

The refractory portion 122M is metallurgically joined with the interface portion 442 as illustrated by way of example in FIG. 17. The refractory portion 122M may be deposited directly onto the interface portion 442 by additive manufacturing or any other suitable manufacturing process, such as by a laser weld from a selective laser melting process. The refractory portion 122M has another physical characteristic different from a physical characteristic of the structural portion 124. The other physical characteristic of the refractory portion 122M may include excellent resistance to elevated temperatures that may result in damage or degradation of a desired property. The refractory portion 122M may also be formed by additive manufacturing or any other suitable manufacturing process.

A multi-material structure 840 constructed according to another aspect is illustrated in a lower portion of FIG. 17. Such a multi-material structure 840 is intended for and suitable for use in applications where relatively high strength and relatively elevated temperatures resistance is desired.

To construct the multi-material structure 840 a structural portion 124 is formed or supplied. The structural portion 124 has a physical characteristic that may include excellent strength, especially at elevated temperatures. The structural portion 124 is preferably formed and supplied in a desired finished configuration. The structural portion 124 may include, for example, at least one of Ti-6Al-4V, Ti-6Al-2Sn-4Zr-2Mo, and TiAl. The structural portion 124 may include a titanium alloy in a phase of at least one of a near-alpha, alpha-beta, near-beta, beta, and gamma.

A refractory portion 364M is metallurgically joined with the refractory portion 122M as illustrated by way of example in FIG. 17. The refractory portion 364M may be deposited onto the structural portion 124 by additive manufacturing or any other suitable manufacturing process, such as by a laser weld from a selective laser melting process. The refractory portion 364M has another physical characteristic different from a physical characteristic of the structural portion 124. The other physical characteristic of the refractory portion may include excellent resistance to elevated temperatures that may result in damage or degradation of a desired property.

The refractory portion 364M may also be formed by additive manufacturing or any other suitable manufacturing process. The refractory portion 364M is preferably formed and supplied in a desired configuration. The refractory portion 364M may include at least one metal of niobium (Nb), molybdenum (Mo), tantalum (Ta), tungsten (W), rhenium (Re), iridium (Ir), vanadium (V), and ruthenium (Ru), and alloys thereof. As one general non-limiting example, the refractory portion 364M may be, or may include, niobium (Nb) or an alloy thereof. As one specific non-limiting example, the refractory portion 364M may be, or may include, a niobium-hafnium-titanium alloy, such as C-103 niobium alloy. The refractory portion 364M may be formed with a core having an open cell structure 366, such as an additive core having an open cell structure. The open cell structure 366 provides a multi-material structure 540 that is relatively light in weight and uses less material, thereby reducing material cost.

An interface portion 442 is bonded or metallurgically joined with the structural portion 124. The interface portion 442 is located between and attaches the structural portion 124 with the refractory portion 364M. The interface portion 442 is employed to better join the structural portion 124 to the with the refractory portion 364M. The interface portion 442 may be formed from a mixed composition of the materials of the structural portion 124 and refractory portion 364M. The interface portion 442 may be formed from a mixed composition powder deposited onto at least one of the structural portion 124 and the refractory portion 364M.

The interface portion 442 may be formed by additive manufacturing or any other suitable process. The interface portion 442 may be constructed from the materials of the structural portion 124 and of the refractory portion 364M. The interface portion 442 may be formed by functional grading additive manufacture. The interface portion 442 may be constructed from a mixture of the materials of the refractory portion 364M and of the structural portion 124. The interface portion 442 may be deposited in layers of the different materials to establish a graded mixture of the materials. For example, layer by layer would gradually transition from 100 percent of the materials of the structural portion 124 to 100 percent of the materials of the refractory portion 364M.

The refractory portion 364M is metallurgically joined with a surface of interface portion 442. The refractory portion 364M may be deposited onto the interface portion 442 by additive manufacturing or any other suitable manufacturing process, such as by a laser weld from a selective laser melting process. The refractory portion 364M has another physical characteristic different from a physical characteristic of the structural portion 124. The other physical characteristic of the refractory portion 364M may include excellent resistance to elevated temperatures that may result in damage or degradation of a desired property. The refractory portion 364M may be formed with a core having an open cell structure 366, such as an additive core having an open cell structure. The open cell structure 366 provides a multi-material structure 840 that is relatively light in weight and uses less material, thereby reducing material cost.

Figure 18:
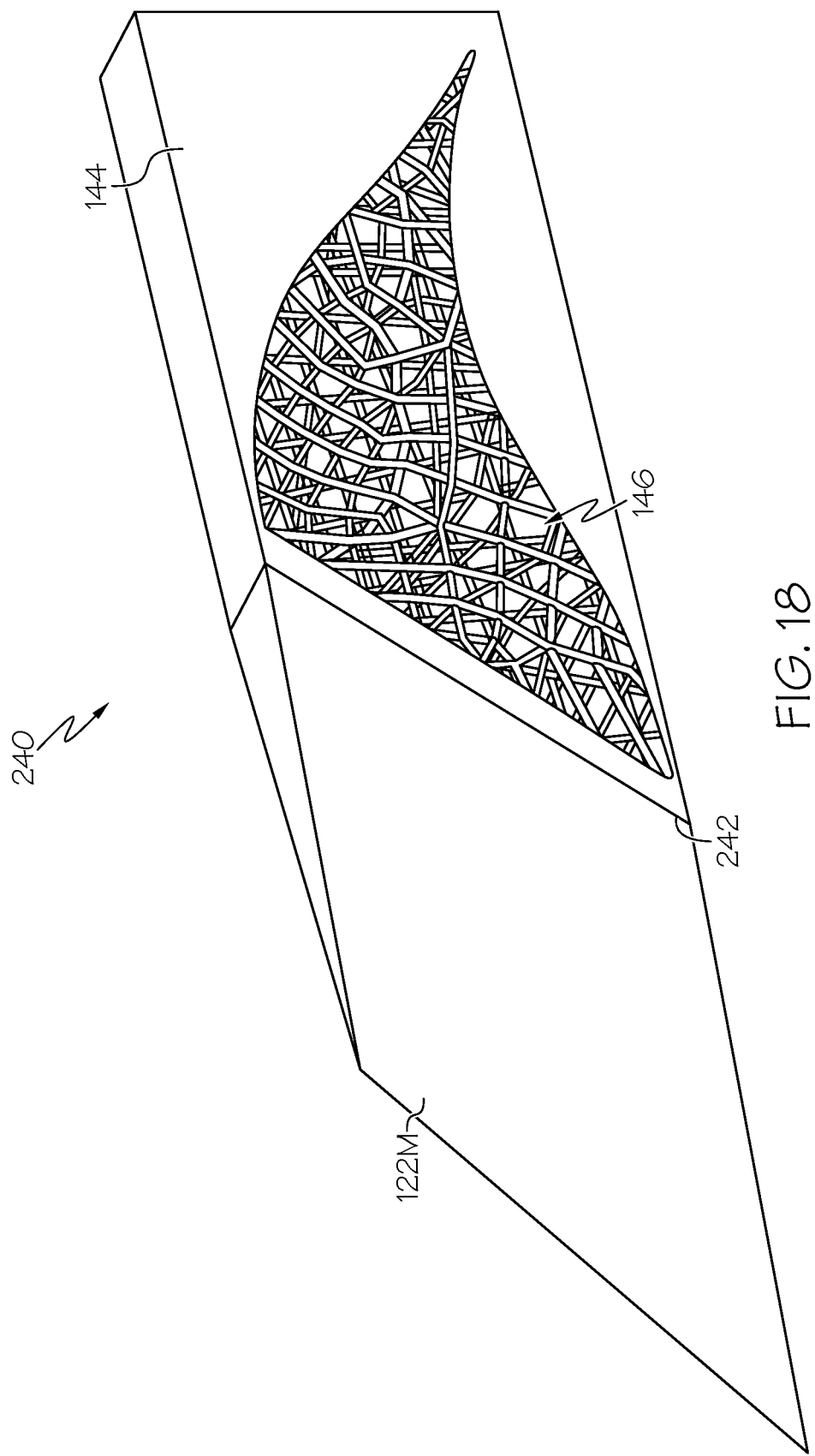
FIGS. 18 and 19 are graphical illustrations in section of representative multi-material structures.

FIG. 18 is an exemplary pictorial representation of a typical multi-material structure 240. The typical multi-material structure 240 includes a refractory portion 122M. The typical multi-material structure 240 also includes a structural portion 144. The structural portion 144 may include a core with an open cell structure 146, such as an additive core having an open cell structure. The typical multi-material structure 240 has an interface portion 242.

Figure 19:
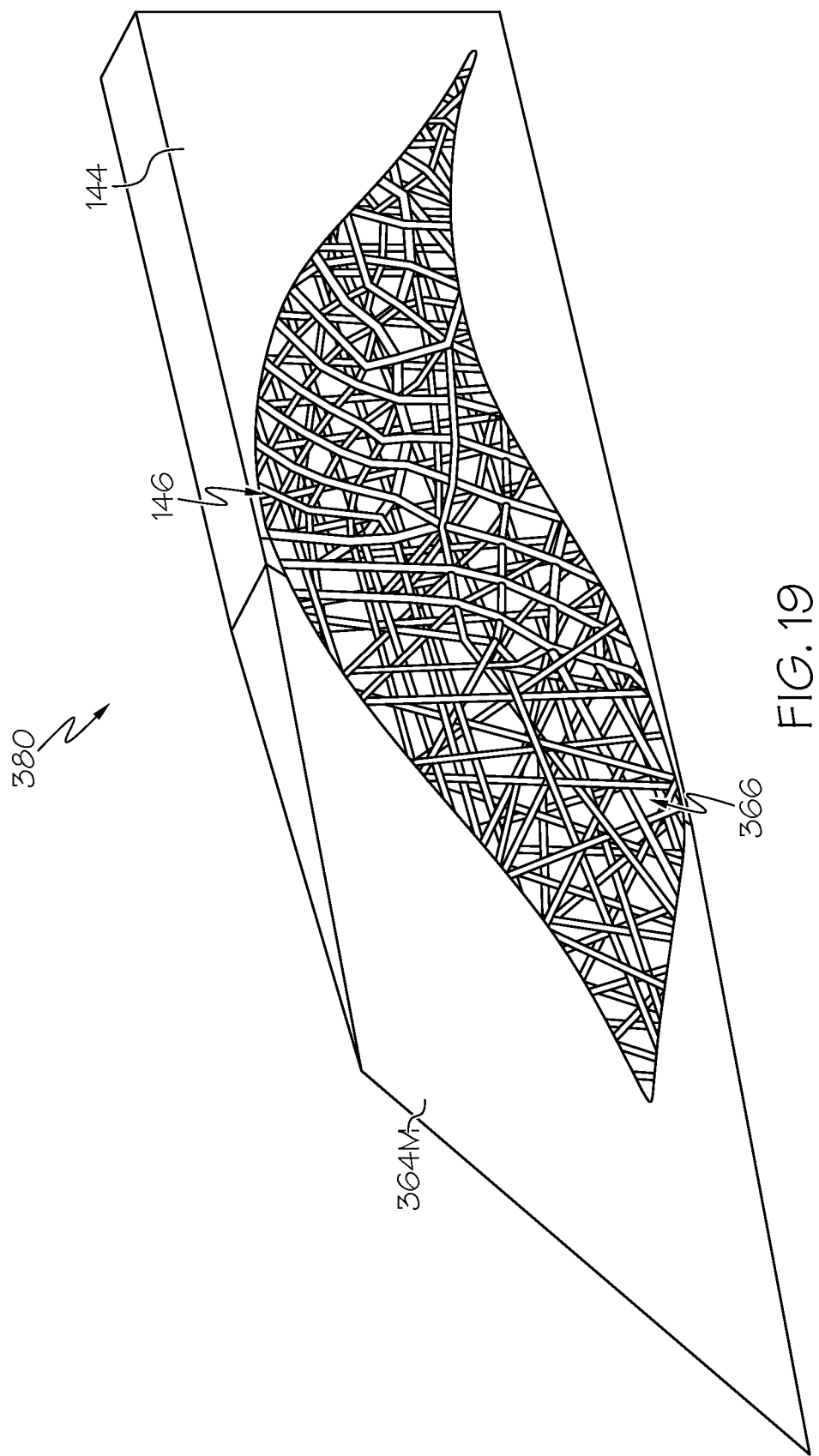

FIG. 19 is an exemplary pictorial representation of a typical multi-material structure 380. The typical multi-material structure 380 includes a refractory portion 364M. The refractory portion 364M may include a core with an open cell structure 366, such as an additive core having an open cell structure. The typical multi-material structure 380 also includes a structural portion 144. The structural portion 144 may include a core with an open cell structure 146.

Further, the disclosure comprise examples according to the following clauses:

Clause 1. A multi-material structure comprising: a refractory portion comprising at least one of niobium (Nb), molybdenum (Mo), tantalum (Ta), tungsten (W), rhenium (Re), iridium (Ir), vanadium (V), and ruthenium (Ru); and a structural portion metallurgically joined with the refractory portion, the structural portion comprising a titanium (Ti) alloy, wherein at least one of the refractory portion and the structural portion is additively manufactured.

Clause 2. The multi-material structure of Clause 1 wherein the refractory portion comprises a body centered cubic metal alloy.

Clause 3. The multi-material structure of Clause 1 wherein the structural portion comprises a titanium alloy in a phase of at least one of a near-alpha, alpha-beta, near-beta, beta, and gamma.

Clause 4. The multi-material structure of Clause 1 wherein the structural portion comprises at least one of Ti-6Al-4V, Ti-6Al-2Sn-4Zr-2Mo, and TiAl.

Clause 5. The multi-material structure of Clause 1 wherein the refractory portion is additively manufactured.

Clause 6. The multi-material structure of Clause 1 wherein the structural portion is additively manufactured.

Clause 7. The multi-material structure of Clause 1 wherein at least one of the refractory portion and the structural portion comprises a core having an open cell structure.

Clause 8. The multi-material structure of Clause 1 further comprising an interface portion between the refractory portion and the structural portion.

Clause 9. The multi-material structure of Clause 8 wherein at least one of the refractory portion and the structural portion being applied to the interface portion by additive manufacturing.

Clause 10. The multi-material structure of Clause 8 wherein the interface portion is formed from a mixed composition metallurgically joining the refractory portion and the structural portion.

Clause 11. The multi-material structure of Clause 10 wherein the interface portion is formed from a mixed composition powder deposited onto at least one of the refractory portion and the structural portion by additive manufacturing.

Clause 12. The multi-material structure of Clause 1 comprising the refractory portion being machined.

Clause 13. The multi-material structure of Clause 1 comprising the refractory portion being additively manufactured to a desired shape.

Clause 14. A multi-material structure comprising: a refractory portion; and a structural portion deposited onto the refractory portion, the structural portion having a physical characteristic different from a physical characteristic of the refractory portion, wherein the structural portion is deposited onto the refractory portion by additive manufacturing.

Clause 15. The multi-material structure of Clause 14 wherein the refractory portion comprises at least one of niobium (Nb), molybdenum (Mo), tantalum (Ta), tungsten (W), rhenium (Re), iridium (Ir), vanadium (V), and ruthenium (Ru), and alloys thereof.

Clause 16. The multi-material structure of Clause 14 wherein the refractory portion comprises a niobium (Nb) alloy.

Clause 17. The multi-material structure of Clause 14 wherein the structural portion comprises at least one of Ti-6Al-4V, Ti-6Al-2Sn-4Zr-2Mo, and TiAl.

Clause 18. The multi-material structure of Clause 14 wherein the structural portion comprises a titanium alloy in a phase of at least one of a near-alpha, alpha-beta, near-beta, beta, and gamma.

Clause 19. The multi-material structure of Clause 14 wherein at least one of the refractory portion and the structural portion comprises a core having an open cell structure.

Clause 20. The multi-material structure of Clause 14 comprising an interface portion between the refractory portion and the structural portion.

Clause 21. The multi-material structure of Clause 20 wherein the interface portion is deposited by additive manufacturing.

Clause 22. The multi-material structure of Clause 20 wherein the interface portion is formed from a mixed composition metallurgically joining the refractory portion and the structural portion.

Clause 23. The multi-material structure of Clause 22 wherein the interface portion is formed from a mixed composition powder deposited onto at least one of the refractory portion and the structural portion by additive manufacturing.

Clause 24. The multi-material structure of Clause 20 wherein the refractory portion is machined.

Clause 25. The multi-material structure of Clause 14 comprising the refractory portion being additively manufactured to a desired shape.

Clause 26. A method for manufacturing a multi-material structure comprising a refractory portion and a structural portion metallurgically joined with the refractory portion, the refractory portion comprising at least one of niobium (Nb), molybdenum (Mo), tantalum (Ta), tungsten (W), rhenium (Re), iridium (Jr), vanadium (V), and ruthenium (Ru), the method comprising: depositing by additive manufacturing a titanium alloy onto the refractory portion to yield the structural portion.

Clause 27. The method of Clause 26 wherein the titanium alloy is in a phase of at least one of a near-alpha, alpha-beta, near-beta, beta, and gamma.

Clause 28. The method of Clause 26 wherein the titanium alloy comprises at least one of Ti-6Al-4V, Ti-6Al-2Sn-4Zr-2Mo, and TiAl.

Clause 29. The method of Clause 26 wherein the depositing by additive manufacturing the titanium alloy onto the refractory portion to yield the structural portion comprising forming a core having an open cell structure.

Clause 30. The method of Clause 26 wherein the refractory portion is formed by additive manufacturing.

Clause 31. The method of Clause 26 wherein the refractory portion comprises a niobium (Nb) alloy.

Clause 32. The method of Clause 26 further comprising forming an interface portion on the refractory portion prior to the depositing by additive manufacturing the titanium alloy onto the refractory portion to yield the structural portion.

Clause 33. The method of Clause 32 wherein the interface portion is formed by additive manufacturing.

Clause 34. The method of Clause 32 wherein the interface portion is formed from a mixed composition metallurgically joining the refractory portion and the structural portion Clause 35. The method of Clause 34 wherein the interface portion is formed by depositing a mixed composition powder deposited onto at least one of the refractory portion and the structural portion by additive manufacturing.

Clause 36. The method of Clause 26 further including machining at least one of the refractory portion and the structural portion.

Clause 37. The multi-material structure of Clause 26 forming at least one of the refractory portion and the structural portion by additive manufacturing to a desired shape.

Clause 38. A method for manufacturing a multi-material structure comprising a refractory portion and a structural portion metallurgically joined with the refractory portion, the structural portion comprising a titanium alloy, the method comprising: depositing by additive manufacturing a metal or metal alloy comprising at least one of niobium (Nb), molybdenum (Mo), tantalum (Ta), tungsten (W), rhenium (Re), iridium (Ir), vanadium (V), and ruthenium (Ru) onto the titanium alloy of the structural portion to yield the refractory portion.

Clause 39. The method of Clause 38 wherein the metal or metal alloy of the refractory portion comprises niobium (Nb).

Clause 40. The method of Clause 38 wherein the metal or metal alloy of the refractory portion comprises a niobium-hafnium-titanium alloy.

Clause 41. The method of Clause 38 wherein the depositing by additive manufacturing the metal or metal alloy onto the titanium alloy comprising depositing by additive manufacturing the metal or metal alloy to yield the refractory portion comprising a core having an open cell structure.

Clause 42. The method of Clause 38 wherein the titanium alloy is in a phase of at least one of a near-alpha, alpha-beta, near-beta, beta, and gamma.

Clause 43. The method of Clause 38 wherein the titanium alloy comprises at least one of Ti-6Al-4V, Ti-6Al-2Sn-4Zr-2Mo, and TiAl.

Clause 44. The method of Clause 38 wherein the structural portion is formed by additive manufacturing.

Clause 45. The method of Clause 38 further comprising forming an interface portion on the refractory portion prior to the depositing by additive manufacturing the titanium alloy onto the refractory portion to yield the structural portion.

Clause 46. The method of Clause 45 wherein the interface portion is formed by additive manufacturing.

Clause 47. The method of Clause 45 wherein the interface portion is formed from a mixed composition joining the refractory portion and the structural portion.

Clause 48. The method of Clause 47 wherein the interface portion is formed by depositing a mixed composition powder deposited onto at least one of the refractory portion and the structural portion by additive manufacturing.

Although various aspects of the disclosed multi-material structure have been shown and described, modifications may occur to those skilled in the art upon reading the specification. The present application includes such modifications and is limited only by the scope of the claims.

What is claimed is:

1. A multi-material structure comprising:
   a machined refractory portion provided in a finished configuration, the refractory portion comprising at least one of niobium (Nb), molybdenum (Mo), tantalum (Ta), tungsten (W), rhenium (Re), iridium (Ir), vanadium (V), and ruthenium (Ru);
   an additively manufactured structural portion comprising a titanium alloy, wherein the additively manufactured structural portion further comprises a core having an open cell structure; and
   an interface portion metallurgically joining the machined refractory portion and the additively manufactured structural portion.

2. The multi-material structure of claim 1 wherein the refractory portion comprises a body centered cubic metal alloy.

3. The multi-material structure of claim 1 wherein the additively manufactured structural portion comprises a titanium alloy in a phase of at least one of a near-alpha, alpha-beta, near-beta, beta, and gamma.

4. The multi-material structure of claim 1 wherein the additively manufactured structural portion comprises at least one of Ti-6Al-4V, Ti-6Al-2Sn-4Zr-2Mo, and TiAl.

5. The multi-material structure of claim 1 wherein the interface comprises a mixed composition metallurgically joining the refractory portion and the additively manufactured structural portion.

6. The multi-material structure of claim 1 wherein the interface comprises a mixed composition powder deposited onto the refractory portion by additive manufacturing.

7. The multi-material structure of claim 1 wherein the interface comprises a graded composition.

8. The multi-material structure of claim 1 wherein the interface comprises a plurality of layers.

9. The multi-material structure of claim 8 wherein the plurality of layers define a compositional gradient.

10. The multi-material structure of claim 1 wherein the interface comprises titanium.

11. The multi-material structure of claim 1 wherein the interface comprises niobium.

12. The multi-material structure of claim 1 wherein the interface portion is a continuous solid structure formed by additive manufacturing.

13. A multi-material structure comprising:
    a machined refractory portion provided in a finished configuration;
    an additively manufactured structural portion having a physical characteristic different from a physical characteristic of the refractory portion, wherein the additively manufactured structural portion comprises a core having an open cell structure; and
    an interface portion metallurgically joining the machined refractory portion and the additively manufactured structural portion.

14. The multi-material structure of claim 13 wherein the refractory portion comprises at least one of niobium (Nb), molybdenum (Mo), tantalum (Ta), tungsten (W), rhenium (Re), iridium (Ir), vanadium (V), and ruthenium (Ru), and alloys thereof.

15. The multi-material structure of claim 13 wherein the refractory portion comprises a niobium (Nb) alloy.

16. The multi-material structure of claim 13 wherein the structural portion comprises at least one of Ti-6Al-4V, Ti-6Al-2Sn-4Zr-2Mo, and TiAl.

17. The multi-material structure of claim 13 wherein the structural portion comprises a titanium alloy in a phase of at least one of a near-alpha, alpha-beta, near-beta, beta, and gamma.

18. The multi-material structure of claim 13 wherein the interface portion is a continuous solid structure formed by additive manufacturing.

19. A multi-material structure comprising:
    a machined refractory portion provided in a finished configuration, the machined refractory portion comprising a body centered cubic metal alloy comprising at least one of niobium (Nb), molybdenum (Mo), tantalum (Ta), tungsten (W), rhenium (Re), iridium (Ir), vanadium (V), and ruthenium (Ru);
    an additively manufactured structural portion comprising a titanium alloy in a phase of at least one of a near-alpha, alpha-beta, near-beta, beta, and gamma, wherein the additively manufactured structural portion comprises at least one of Ti-6Al-4V, Ti-6Al-2Sn-4Zr-2Mo, and TiAl, wherein the additively manufactured structural portion comprises a core having an open cell structure; and
    an interface portion metallurgically joining the machined refractory portion and the additively manufactured structural portion.

20. The multi-material structure of claim 19 wherein the interface portion is a continuous solid structure formed by additive manufacturing.

* * * * *